(12) United States Patent
Umeda et al.

(10) Patent No.: US 10,559,988 B2
(45) Date of Patent: Feb. 11, 2020

(54) ROTOR FOR ROTARY ELECTRIC MACHINE

(71) Applicant: MITSUBISHI ELECTRIC CORPORATION, Chiyoda-ku (JP)

(72) Inventors: Takashi Umeda, Chiyoda-ku (JP); Hiroki Kitani, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 38 days.

(21) Appl. No.: 15/743,724

(22) PCT Filed: Jul. 31, 2015

(86) PCT No.: PCT/JP2015/071826
§ 371 (c)(1),
(2) Date: Jan. 11, 2018

(87) PCT Pub. No.: WO2017/022021
PCT Pub. Date: Feb. 9, 2017

(65) Prior Publication Data
US 2018/0212484 A1      Jul. 26, 2018

(51) Int. Cl.
*H02K 1/27*    (2006.01)
*H02K 1/28*    (2006.01)
*H02K 1/30*    (2006.01)

(52) U.S. Cl.
CPC .............. *H02K 1/278* (2013.01); *H02K 1/27* (2013.01); *H02K 1/28* (2013.01); *H02K 1/30* (2013.01); *H02K 2201/06* (2013.01)

(58) Field of Classification Search
CPC ...... H02K 2201/06; H02K 1/27; H02K 1/278; H02K 1/2706; H02K 1/2713; H02K 1/272;
(Continued)

(56) References Cited

U.S. PATENT DOCUMENTS

2002/0135252 A1*    9/2002    Burton ................... H02K 1/278
                                                              310/156.12
2008/0053639 A1    3/2008    Lin et al.
(Continued)

FOREIGN PATENT DOCUMENTS

CN            1531771 A1       9/2004
CN         102611224 A         7/2012
(Continued)

OTHER PUBLICATIONS

Miyamoto Tadahiro; Tsumagari Hiroshi; Morishita Daisuke, Aug. 9, 2012 Rotary Electric Machine and Wind Power Generation System, Yaskawa Electric, JP 4771010 (English Mashine Translation) (Year: 2012).*
(Continued)

*Primary Examiner* — Mang Tin Bik Lian
*Assistant Examiner* — Alexander A Singh
(74) *Attorney, Agent, or Firm* — Xsensus LLP

(57) ABSTRACT

A first magnet group provided to a first core member and a second magnet group provided to a second core member are adjacent to each other in an axial direction of a rotor. The first magnet group includes a plurality of first magnets arrayed in a circumferential direction of the rotor. The second magnet group includes a plurality of second magnets arrayed in the circumferential direction. The first magnet and the second magnet, which are adjacent to each other and have the same polarity, are shifted from each other by a certain angle in the circumferential direction. One of the first core member and the second core member has a first recessed portion, and another of the first core member and the second core member has a first protruding portion to be engaged with the first recessed portion in the circumferential direction.

20 Claims, 21 Drawing Sheets

(58) Field of Classification Search
CPC .... H02K 1/2726; H02K 1/2733; H02K 1/274; H02K 1/2746; H02K 1/2753; H02K 1/276; H02K 1/2766; H02K 1/2773; H02K 1/2786; H02K 1/279; H02K 1/28; H02K 1/30
USPC .................................................. 310/156.47
See application file for complete search history.

(56) References Cited

U.S. PATENT DOCUMENTS

| | | | |
|---|---|---|---|
| 2010/0019606 A1* | 1/2010 | Mizutani | H02K 21/046 310/181 |
| 2012/0187696 A1 | 7/2012 | Miyamoto et al. | |
| 2014/0139065 A1* | 5/2014 | Yamada | H02K 21/16 310/156.66 |

FOREIGN PATENT DOCUMENTS

| | | |
|---|---|---|
| CN | 204012974 U | 12/2014 |
| JP | 2000-50548 A | 2/2000 |
| JP | 2002-58184 A | 2/2002 |
| JP | 2004-153913 A | 5/2004 |
| JP | 2008-106739 A | 5/2008 |
| JP | 2010119192 A | 5/2010 |
| JP | 4771010 B * | 8/2012 |

OTHER PUBLICATIONS

International Search Report dated Aug. 25, 2015 in PCT/JP2015/071826 filed Jul. 31, 2015.
First Notice of Refusal dated Mar. 15, 2019 in corresponding Chinese Application No. 201580082060.5, 7 pages (with English Translation).
Office Action issued in Chinese Application 201580082060.5 dated Nov. 6, 2019.

* cited by examiner

ROTOR FOR ROTARY ELECTRIC MACHINE

TECHNICAL FIELD

The present invention relates to a rotor for a rotary electric machine, which includes a plurality of magnets provided to a core.

BACKGROUND ART

Hitherto, there has been known a rotor for an electric motor having the following configuration. Specifically, a first block and a second block are mounted to a rotary shaft so as to be aligned in an axial direction. A plurality of first magnets are fixed to an outer peripheral surface of the first block so as to be arrayed in a rotating direction. A plurality of second magnets are fixed to an outer peripheral surface of the second block so as to be arrayed in the rotating direction. The first magnets and the second magnets of the same polarity are shifted from each other in the rotating direction to form a step skew structure. The plurality of first magnets are fixed to the outer peripheral surface of the first block so that magnetic poles of the plurality of first magnets differ alternately in the rotating direction. The plurality of second magnets are fixed to the outer peripheral surface of the second block so that magnetic poles of the plurality of second magnets differ alternately in the rotating direction (see, for example, Patent Literature 1).

CITATION LIST

Patent Literature

[PTL 1] JP 2002-58184 A

SUMMARY OF INVENTION

Technical Problem

However, the first magnets having opposite polarities are adjacent to each other in the rotating direction, and the second magnets having opposite polarities are adjacent to each other in the rotating direction. Further, the first magnet and the second magnet having the same polarity are adjacent to each other in the axial direction of the rotary shaft. Therefore, when the first magnets and the second magnets are to be fixed to the first block and the second block, which are mounted to the rotary shaft, respectively, the first magnets and the second magnets receive a strong magnetic force in both the rotating direction and the axial direction. Thus, an operation of arranging the first magnets and the second magnets so as to be close to each other requires much labor, with the result that productivity of rotors for electric motors is degraded.

The present invention has been made to solve the problem described above, and has an object to provide a rotor for a rotary electric machine, which is capable of improving productivity.

Solution to Problem

According to one embodiment of the present invention, there is provided a rotor for a rotary electric machine, including: a first rotor member; and a second rotor member, the first rotor member including a first core member and a first magnet group provided to the first core member, the second rotor member including a second core member and a second magnet group provided to the second core member, the first core member and the second core member being fixed to each other under a state of being aligned in an axial direction of the rotor, the first magnet group and the second magnet group being adjacent to each other in the axial direction, the first magnet group including a plurality of first magnets arrayed in a circumferential direction of the rotor, the second magnet group including a plurality of second magnets arrayed in the circumferential direction, the first magnet and the second magnet, which are adjacent to each other and have the same polarity, being shifted from each other by a certain angle in the circumferential direction, one of the first core member and the second core member having a first recessed portion, and another of the first core member and the second core member having a first protruding portion to be engaged with the first recessed portion in the circumferential direction.

A rotor for a rotary electric machine, including: a first rotor member; a second rotor member; and a rotor base, the first rotor member including a first core member and a first magnet group provided to the first core member, the second rotor member including a second core member and a second magnet group provided to the second core member, the first core member and the second core member being opposed to each other in a radial direction of the rotor and being fixed to the rotor base in an axial direction of the rotor, the first magnet group and the second magnet group being adjacent to each other in the radial direction, the first magnet group including a plurality of first magnets arrayed in a circumferential direction of the rotor, the second magnet group including a plurality of second magnets arrayed in the circumferential direction, the first magnet and the second magnet, which are adjacent to each other and have the same polarity, being shifted from each other by a certain angle in the circumferential direction, one of at least any one of the first core member and the second core member and the rotor base having a first recessed portion, and another of the at least any one of the first core member and the second core member and the rotor base having a first protruding portion to be engaged with the first recessed portion in the circumferential direction.

Advantageous Effects of Invention

According to the rotary electric machine in the present invention, the first protruding portion is engaged with the first recessed portion in the circumferential direction. As a result, the first rotor member and the second rotor member can be positioned accurately and easily in the circumferential direction and the radial direction. Further, an engaged state between the first protruding portion and the first recessed portion can be more reliably retained by circumferential components of a magnetic repulsive force and a magnetic attractive force which are generated between the first magnets and the second magnets. Based on the above-mentioned fact, the productivity of the rotor can be improved.

DESCRIPTION OF EMBODIMENTS

Now, exemplary embodiments of the present invention are described with reference to the drawings.

First Embodiment

Figure 1:
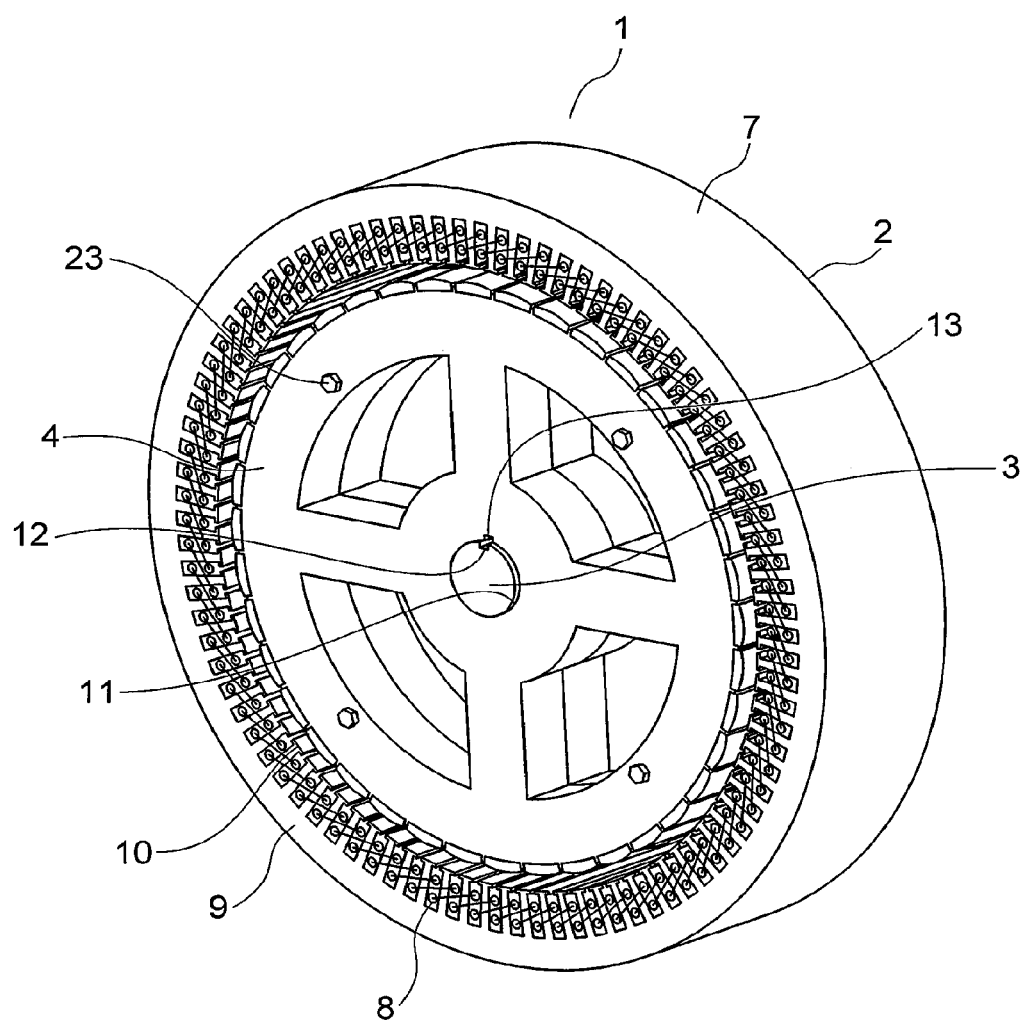
FIG. 1 is a perspective view for illustrating a rotary electric machine according to a first embodiment of the present invention.
Figure 2:
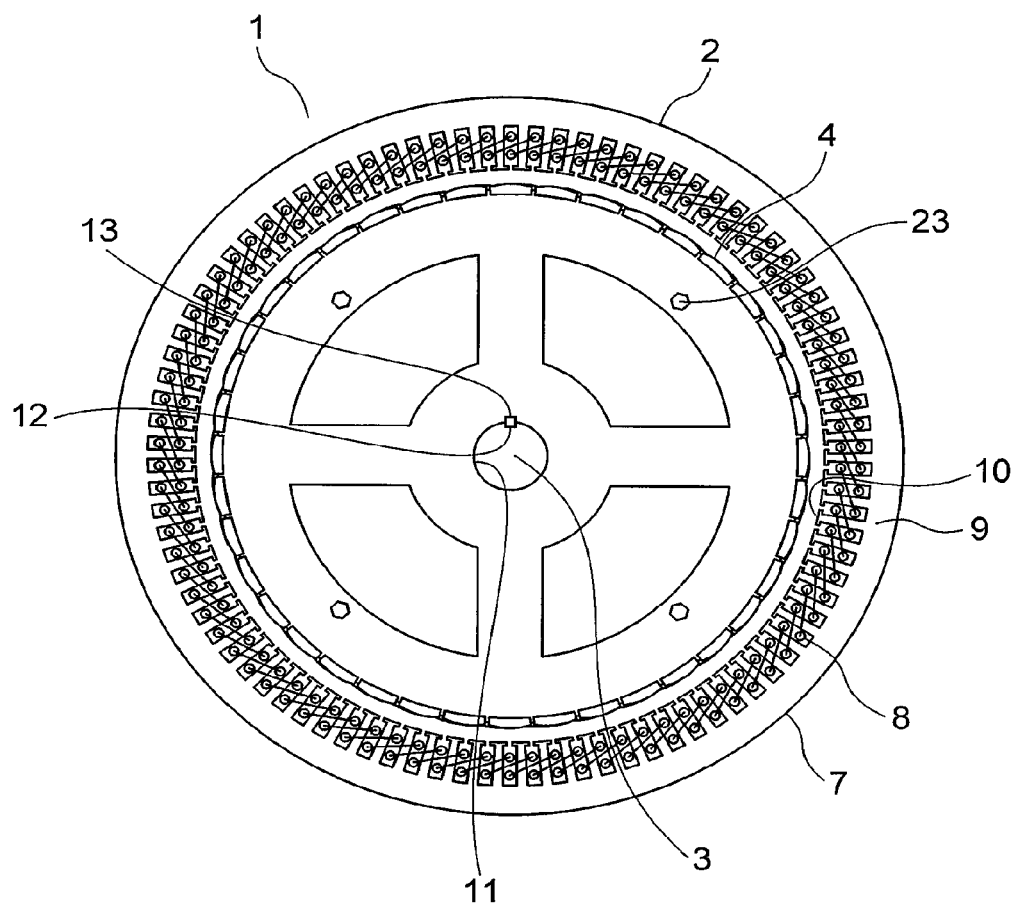
FIG. 2 is a front view for illustrating the rotary electric machine illustrated in FIG. 1.

FIG. 1 is a perspective view for illustrating a rotary electric machine in a first embodiment of the present invention. FIG. 2 is a front view for illustrating the rotary electric machine illustrated in FIG. 1. In FIG. 1 and FIG. 2, the rotary electric machine 1 includes a stator 2, a rotary shaft 3, and a rotor 4. The stator 2 is a tubular armature. The rotary shaft 3 is arranged coaxially with the stator 2. The rotor 4 is fixed to the rotary shaft 3 and is rotated integrally with the rotary shaft 3 with respect to the stator 2. In this example, an inner rotor type rotary electric machine in which the rotor 4 is arranged on a radially inner side of the stator 2 having the tubular shape is used as the rotary electric machine 1.

The stator 2 includes a stator core 7 and stator coils 8. The stator core 7 has a cylindrical shape and is made of a magnetic material such as iron. The stator coils 8 are provided to the stator core 7.

The stator core 7 includes a core back 9 and a plurality of magnetic-pole teeth 10. The core back 9 has a cylindrical shape. The plurality of magnetic-pole teeth 10 project radially inward from an inner peripheral portion of the core back 9. The plurality of magnetic-pole teeth 10 are provided at intervals in a circumferential direction of the stator core 7. Conductive wires of the stator coils 8 pass through slots formed between the magnetic-pole teeth 10. A rotating magnetic field is generated in the stator 2 by supply of an AC current to the stator coils 8.

The rotor 4 is opposed to the stator 2 in a radial direction through a gap therebetween. Further, the rotor 4 is arranged coaxially with the rotary shaft 3. In the center of the rotor 4, a shaft hole 11 being a through hole is formed. The rotary shaft 3 is fitted into the shaft hole 11. A keyway 12 extending along an axis of the rotary shaft 3 is formed in an outer peripheral surface of the rotary shaft 3. A keyway 13 extending along the axis of the rotary shaft 3 is formed in an inner peripheral surface of the shaft hole 11. A common key is fitted into the keyways 12 and 13. In this manner, a position of the rotor 4 with respect to the rotary shaft 3 is fixed in a rotating direction of the rotor 4, specifically, in a circumferential direction of the rotor 4. The rotary shaft 3 and the rotor 4 are rotated about the axis of the rotary shaft 3 with respect to the stator 2 by the generation of the magnetic field in the stator 2.

Figure 3:
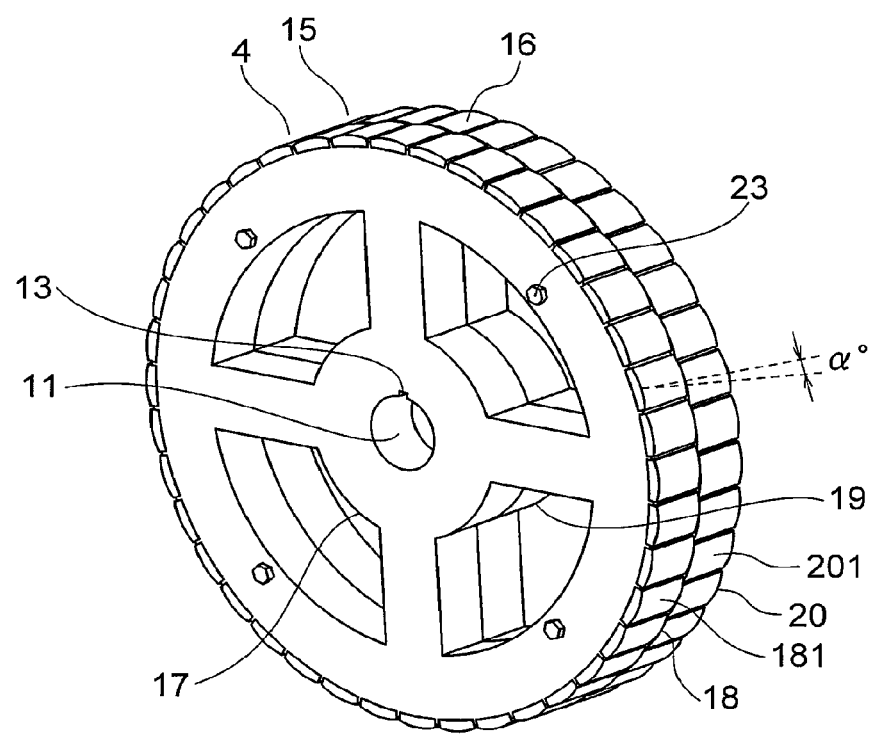
FIG. 3 is a perspective view for illustrating a rotor illustrated in FIG. 1.
Figure 4:
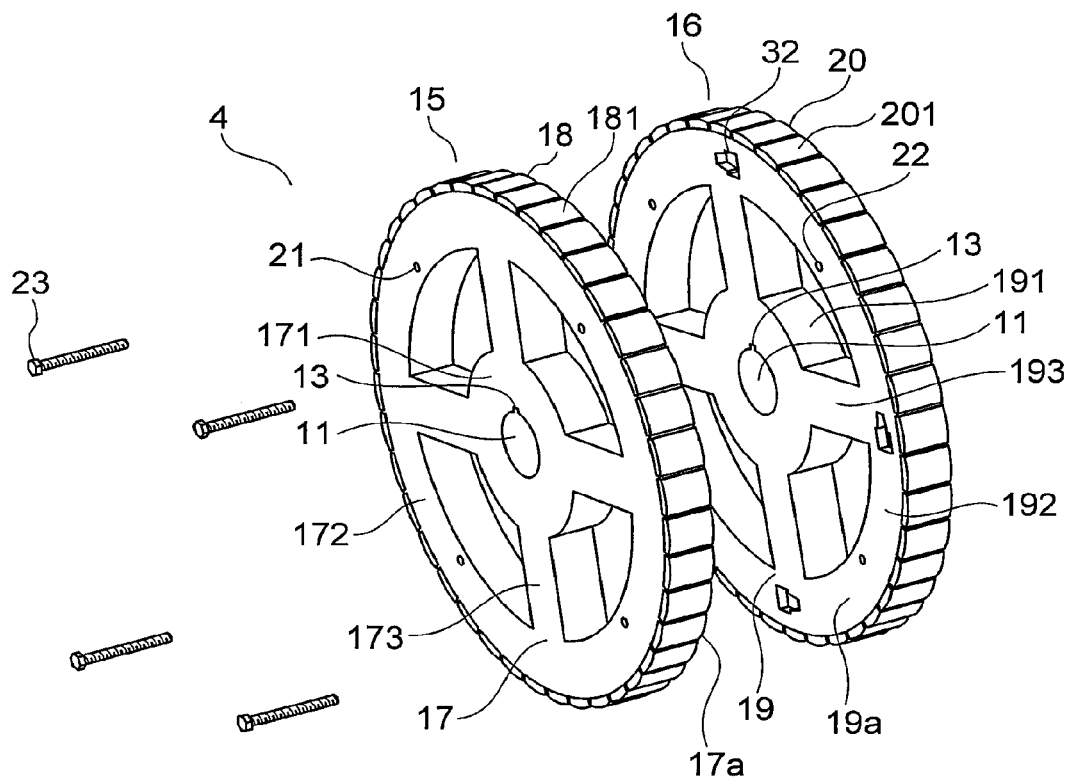
FIG. 4 is an exploded perspective view for illustrating the rotor illustrated in FIG. 3.

FIG. 3 is a perspective view for illustrating the rotor 4 illustrated in FIG. 1. FIG. 4 is an exploded perspective view for illustrating the rotor 4 illustrated in FIG. 3. The rotor 4 includes a first rotor member 15 and a second rotor member 16 aligned in the axial direction of the rotary shaft 3.

The first rotor member 15 includes a first core member 17 and a first magnet group 18. The first core member 17 is made of a magnetic material such as iron. The first magnet group 18 is provided to the first core member 17.

The first core member 17 includes a boss portion 171, an outer annular portion 172, and a plurality of (four in this example) ribs 173. The boss portion 171 has a columnar shape. The outer annular portion 172 has an annular shape and surrounds an outer periphery of the boss portion 171 on a radially outer side of the boss portion 171. The plurality of ribs 173 connect the boss portion 171 and the outer annular portion 172 to each other. In this manner, an outer peripheral surface of the first core member 17 is formed as a cylindrical surface having the axis of the rotary shaft 3 as a center.

The first magnet group 18 includes a plurality of first magnets 181 arrayed in the circumferential direction of the rotor 4. In this example, forty first magnets 181 are fixed to the outer peripheral surface of the first core member 17 so as to be arrayed in the circumferential direction. Each of the first magnets 181 is opposed to the stator 2 in the radial direction of the rotor 4.

The plurality of first magnets 181 are arrayed so that magnetic poles differ alternately in the circumferential direction of the rotor 4. In this manner, the magnetic polarity of one of two first magnets 181 which are adjacent to each other in the circumferential direction of the rotor 4 is the S pole, and the magnetic polarity of another of the first magnets 181 is the N pole.

The second rotor member 16 includes a second core member 19 and a second magnet group 20. The second core member 19 is made of a magnetic material such as iron. The second magnet group 20 is provided to the second core member 19.

The second core member 19 includes a boss portion 191, an outer annular portion 192, and a plurality of (four in this example) ribs 193. The boss portion 191 has a columnar shape. The outer annular portion 192 has an annular shape and surrounds an outer periphery of the boss portion 191 on a radially outer side of the boss portion 191. The plurality of ribs 193 connect the boss portion 191 and the outer annular portion 192 to each other. In this manner, an outer peripheral surface of the second core member 19 is formed as a cylindrical surface having the axis of the rotary shaft 3 as a center.

The second magnet group 20 includes a plurality of second magnets 201 arrayed in the circumferential direction of the rotor 4. The number of second magnets 201 and the number of first magnets 181 are the same. Thus, in this example, forty second magnets 201 are fixed to the outer peripheral surface of the second core member 19 so as to be arrayed in the circumferential direction. Each of the second magnets 201 is opposed to the stator 2 in the radial direction of the rotor 4.

In the second magnet group 20, the plurality of second magnets 201 are arrayed so that magnetic poles differ alternately in the circumferential direction of the rotor 4. In this manner, the magnetic polarity of one of two second magnets 201 which are adjacent to each other in the circumferential direction of the rotor 4 is the S pole, and the magnetic polarity of another of the second magnets 201 is the N pole.

The shaft hole 11 is formed in each of the center of the boss portion 171 of the first core member 17 and the center of the boss portion 191 of the second core member 19. The common rotary shaft 3 is fitted into the shaft hole 11 of the first core member 17 and the shaft hole 11 of the second core member 19. In this manner, the first rotor member 15 and the second rotor member 16 are arranged coaxially with the rotary shaft 3. Further, the first rotor member 15 and the second rotor member 16 are positioned in the rotating direction of the rotor 4 with respect to the rotary shaft 3 by fitting the key into the keyways 12 and 13.

The first rotor member 15 and the second rotor member 16 are arranged so that a side surface 17a of the first core member 17 and a side surface 19a of the second core member 19 are opposed to each other in the axial direction. In this manner, the first magnet group 18 and the second magnet group 20 are adjacent to each other in the axial direction of the rotor 4.

A plurality of first bolt insertion holes 21 are formed in the outer annular portion 172 of the first core member 17 at intervals in the circumferential direction. Each of the first bolt insertion holes 21 is a through hole passing through the outer annular portion 172 in the axial direction. In this example, four first bolt insertion holes 21 are formed in the outer annular portion 172. Each of the first bolt insertion holes 21 is a circular hole having a circular cross section.

The same number of threaded holes 22 as the number of first bolt insertion holes 21 are formed in the side surface 19a of the outer annular portion 192 of the second core member 19 at intervals in the circumferential direction. Therefore, four threaded holes 22 are formed in the outer annular portion 192 in this example. Circumferential positions of the threaded holes 22 match with circumferential positions of the first bolt insertion holes 21.

Bolts 23 are inserted into the first bolt insertion holes 21 of the first core member 17. The plurality of bolts 23 inserted into the first bolt insertion holes 21 are mounted into the threaded holes 22 of the second core member 19. Under a state in which the side surface 17a of the first core member 17 and the side surface 19a of the second core member 19 are held in contact with each other, the first rotor member 15 and the second rotor member 16 are fixed to each other by fastening the bolts 23 inserted into the first bolt insertion holes 21.

Figure 5:
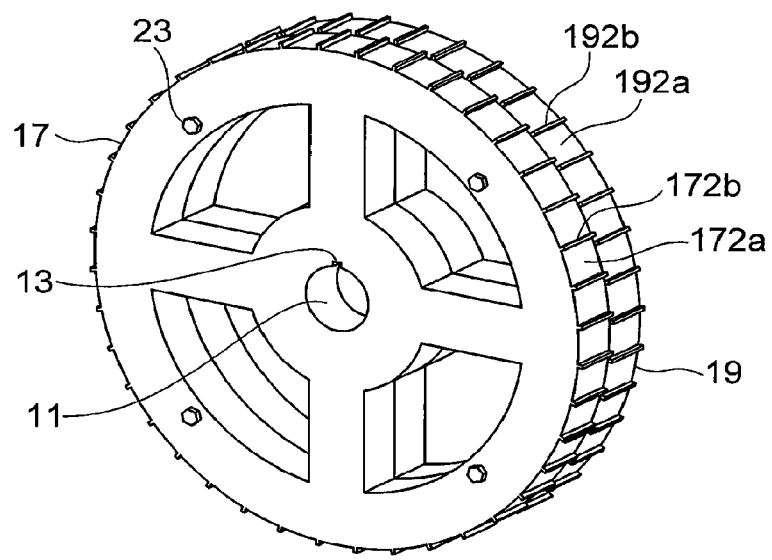
FIG. 5 is a perspective view for illustrating a first core member and a second core member from which first magnets and second magnets illustrated in FIG. 3 are removed.

FIG. 5 is a perspective view for illustrating the first core member 17 and the second core member 19 from which the first magnets 181 and the second magnets 201 illustrated in FIG. 3 are removed. A plurality of magnet arrangement grooves 172a arrayed in a circumferential direction of the first core member 17 are formed in the outer peripheral surface of the outer annular portion 172 of the first core member 17. Two magnet arrangement grooves 172a which are adjacent to each other are partitioned by a groove wall 172b extending along an axis of the first core member 17. A height of the groove wall 172b is smaller than a thickness of each of the first magnets 181. The first magnets 181 are fixed into the magnet arrangement grooves 172a with, for example, an adhesive under a state of being fitted into the magnet arrangement grooves 172a.

A plurality of magnet arrangement grooves 192a arrayed in a circumferential direction of the second core member 19 are formed in the outer peripheral surface of the outer annular portion 192 of the second core member 19. Two magnet arrangement grooves 192a which are adjacent to each other are partitioned by a groove wall 192b extending along an axis of the second core member 19. A height of the groove wall 192b is smaller than a thickness of each of the second magnets 201. The second magnets 201 are fixed into the magnet arrangement grooves 192a with, for example, an adhesive under a state of being fitted into the magnet arrangement grooves 192a.

Figure 6:
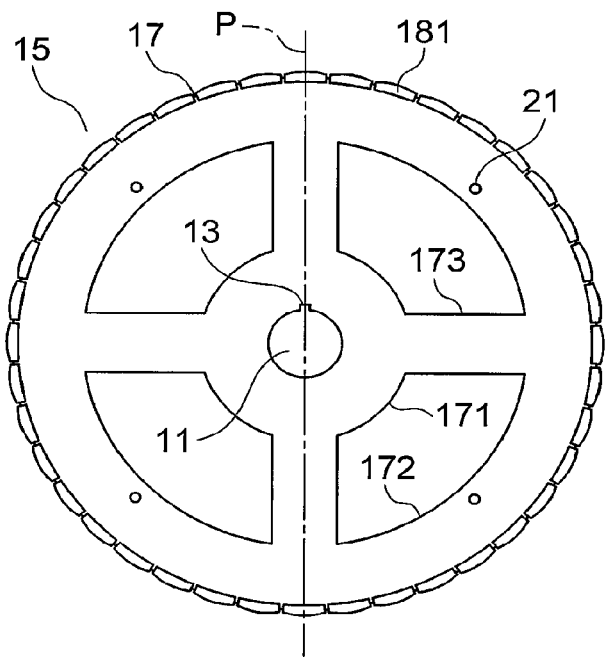
FIG. 6 is a front view for illustrating a first rotor member illustrated in FIG. 4.
Figure 7:
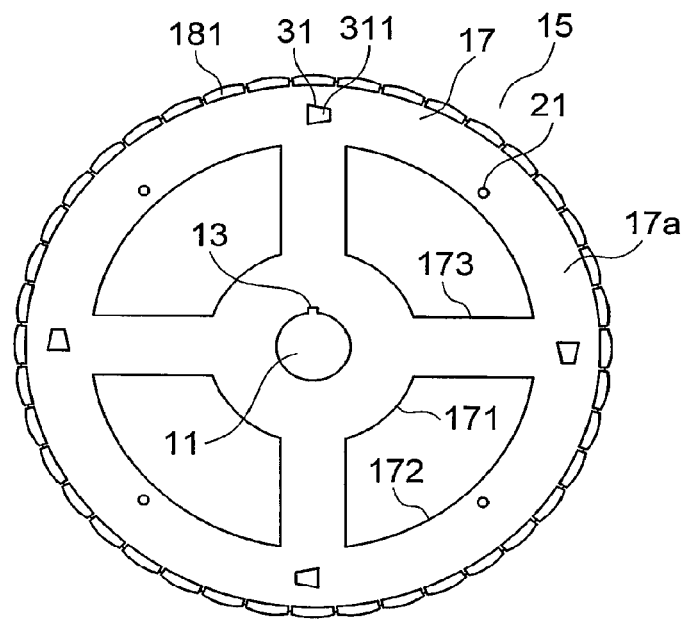
FIG. 7 is a back view for illustrating the first rotor member as viewed from the second rotor member side in FIG. 4.

FIG. 6 is a front view for illustrating the first rotor member 15 illustrated in FIG. 4. FIG. 7 is a back view for illustrating the first rotor member 15 as viewed from the second rotor member 16 side in FIG. 4. Further, FIG. 8 is a front view for illustrating the second rotor member 16 as viewed from the first rotor member 15 side in FIG. 4.

Figure 8:
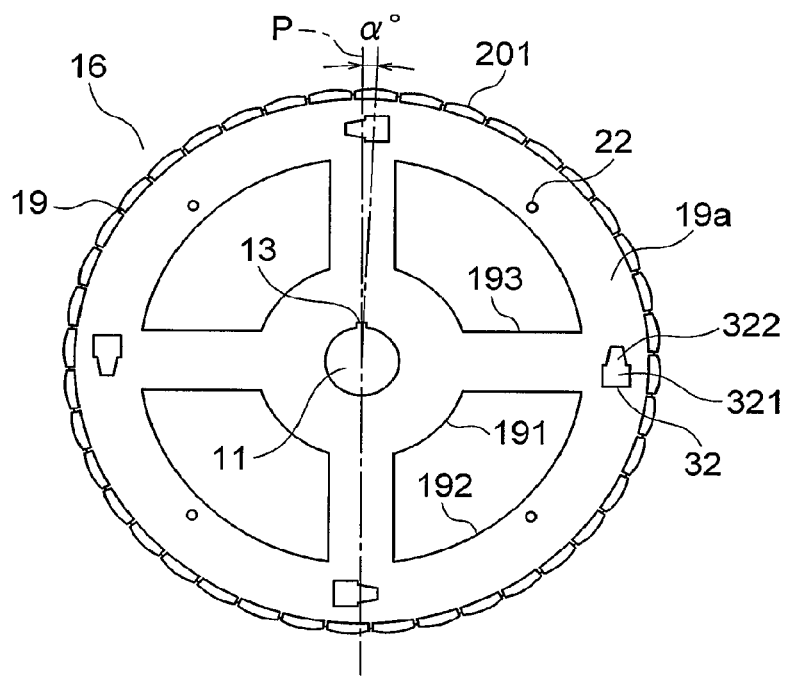
FIG. 8 is a front view for illustrating the second rotor member as viewed from the first rotor member side in FIG. 4.

As illustrated in FIG. 6 and FIG. 8, in the rotor 4, when the rotor 4 is viewed along the axis of the rotary shaft 3, and it is assumed that a straight line passing through the axis of the rotary shaft 3 and the keyways 13 is a reference line P, the circumferential positions of the second magnets 201 with respect to the reference line P are shifted by a certain angle $\alpha°$ in mechanical angle from the circumferential positions of the first magnets 181 with respect to the reference line P. In this manner, the first magnet 181 and the second magnet 201 which are adjacent to each other and have the same magnetic polarity are shifted from each other by the certain angle $\alpha°$ in the circumferential direction of the rotor 4. Specifically, magnetic poles of the second rotor member 16 are arranged so as to be shifted in phase by an electrical angle $\beta°=\alpha°/7$, 200° in the circumferential direction of the rotor 4 with respect to magnetic poles of the first rotor member 15. Hereinafter, the electrical angle $\beta°$ is described as a skew angle, and the mechanical angle $\alpha°$ is described as a skew mechanical angle.

As illustrated in FIG. 7, a plurality of first protruding portions 31 are formed on the side surface 17a of the outer annular portion 172 of the first core member 17. In this example, four first protruding portions 31 are formed on the first core member 17. Further, in this example, the first protruding portions 31 and the first core member 17 are formed of a single member made of the same material. The plurality of first protruding portions 31 are arranged at intervals in the circumferential direction of the first core member 17.

As illustrated in FIG. 8, a plurality of first recessed portions 32 having the same number as the number of the first protruding portions 31 are formed in the side surface 19a of the outer annular portion 192 of the second core member 19. Thus, in this example, four first recessed portions 32 are formed in the second core member 19. The first recessed portions 32 are arranged at intervals in the circumferential direction of the second core member 19 so as to match with circumferential positions of the first protruding portions 31.

The first protruding portions 31 are inserted into the first recessed portions 32 and are engaged with the first recessed portions 32 in the circumferential direction of the rotor 4. The first protruding portions 31 are engaged with the first recessed portions 32 while taking the same orientation in the circumferential direction of the rotor 4. Further, each of the first protruding portions 31 has a first protruding-portion engagement portion 311 to be fitted into the first recessed portion 32. A width direction of the first protruding-portion engagement portion 311 matches with the radial direction of the rotor 4. Further, a width of the first protruding-portion engagement portion 311 continuously decreases in a direction in which the first protruding portion 31 is brought into engagement with the first recessed portion 32. Specifically, the first protruding-portion engagement portion 311 has such a tapered shape that a width of the first protruding portion 31 continuously decreases toward one circumferential end portion of the first protruding portion 31.

As illustrated in FIG. 8, each of the first recessed portions 32 has a first recessed-portion insertion portion 321 and a first recessed-portion engagement portion 322 projecting from the first recessed-portion insertion portion 321 in the circumferential direction of the rotor 4. A width direction of the first recessed-portion engagement portion 322 matches with the radial direction of the rotor 4.

A size of the first recessed-portion insertion portion 321 is such that the first protruding portion 31 is accommodated therein when the rotor 4 is viewed along the axial direction. In this example, the first recessed-portion insertion portion 321 has a rectangular shape as viewed along the axial direction of the rotor 4.

A width of the first recessed-portion engagement portion 322 gradually decreases in the direction in which the first protruding portion 31 is brought into engagement with the first recessed portion 32. Specifically, the first recessed-portion engagement portion 322 has such a tapered shape that a width of the first recessed portion 32 continuously decreases toward one circumferential end portion of the first recessed portion 32. Positions of the first protruding portions 31 are fixed in the circumferential direction and the radial direction of the rotor 4 with respect to the first recessed portions 32 by fitting of the first protruding-portion engagement portions 311 into the first recessed-portion engagement portions 322.

Figure 9:
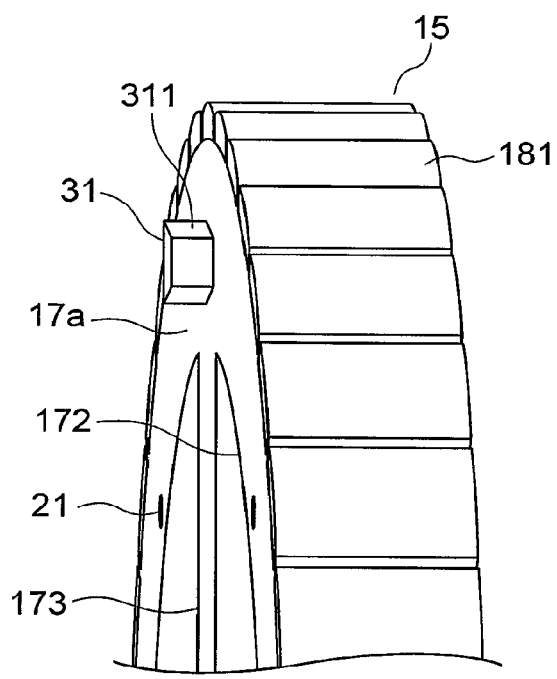
FIG. 9 is an enlarged perspective view for illustrating a first protruding portion of the first rotor member illustrated in FIG. 7.

FIG. 9 is an enlarged perspective view for illustrating the first protruding portion 31 of the first rotor member 15 illustrated in FIG. 7. The first protruding portion 31 projects from the side surface 17a of the outer annular portion 172 of the first core member 17 along the axial direction. In this example, the width of the first protruding portion 31 in the radial direction of the rotor 4 is constant at any position in a projecting direction of the first protruding portion 31. Further, in this example, the width of the first recessed portion 32 in the radial direction of the rotor 4 is also constant at any position in a depth direction of the first recessed portion 32.

Next, a method of manufacturing the rotor 4 is described. When the rotor 4 is to be manufactured, the first rotor member 15 and the second rotor member 16 which are manufactured in advance are assembled to each other.

When the first rotor member 15 and the second rotor member 16 are to be assembled to each other, the first protruding portions 31 are inserted into the first recessed portions 32 under a state in which the side surface 17a of the first core member 17 and the side surface 19a of the second core member 19 are opposed to each other.

Figure 10:
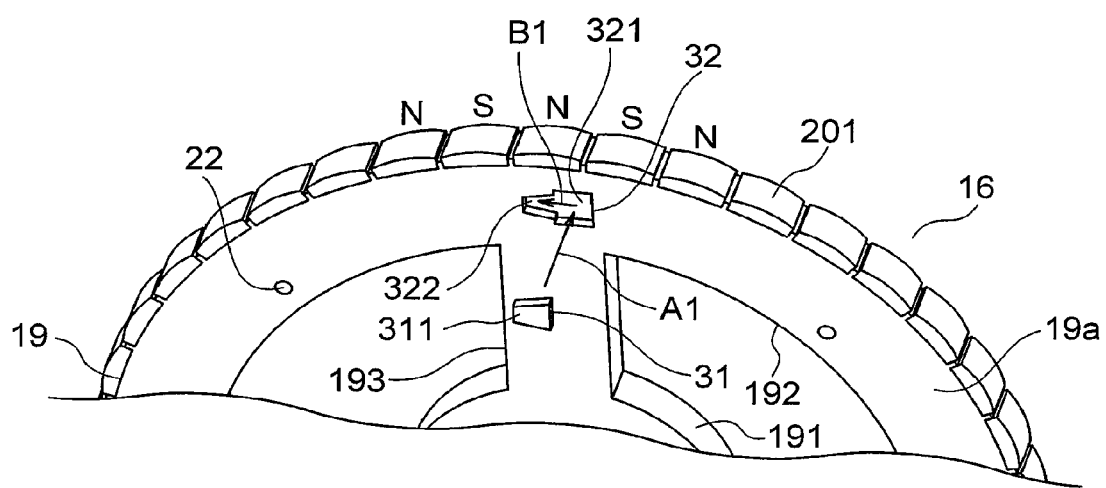
FIG. 10 is a perspective view for illustrating a state in which the first protruding portion illustrated in FIG. 7 is to be inserted into a first recessed portion illustrated in FIG. 8.

FIG. 10 is a perspective view for illustrating a state in which the first protruding portion 31 illustrated in FIG. 7 is to be inserted into the first recessed portion 32 illustrated in FIG. 8. In FIG. 10, for the sake of simplicity, only the first protruding portion 31 of the first rotor member 15 is illustrated, and illustration of other portions is omitted. When the first protruding portion 31 is to be inserted into the first recessed portion 32, as indicated by the arrow A1 in FIG. 10, the first protruding portion 31 is first inserted into the first recessed-portion insertion portion 321 while the first rotor member 15 is brought closer to the second rotor member 16.

Figure 11:
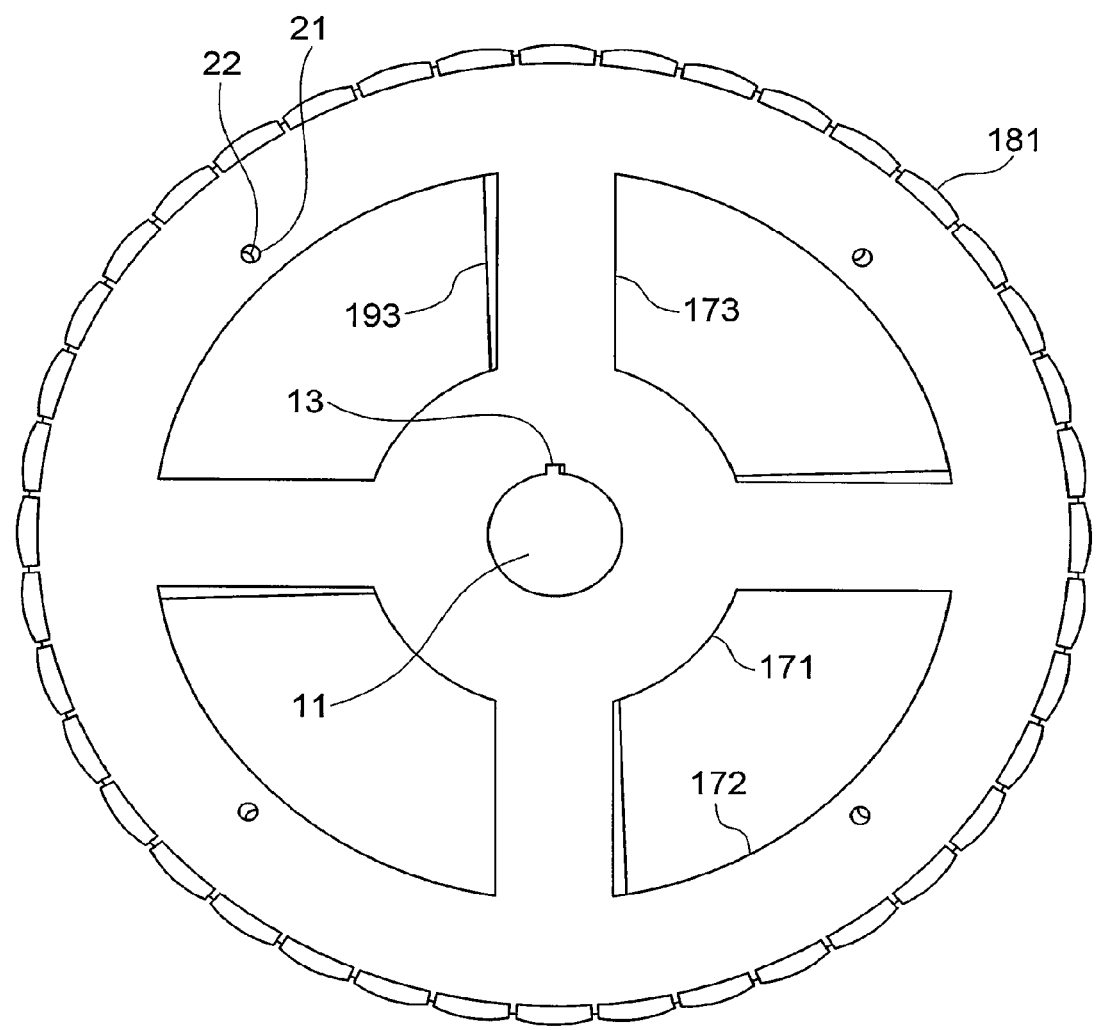
FIG. 11 is a front view for illustrating a circumferential positional relationship between the first rotor member and the second rotor member when the first protruding portions illustrated in FIG. 10 are inserted into first recessed-portion insertion portions.

FIG. 11 is a front view for illustrating a circumferential positional relationship between the first rotor member 15 and the second rotor member 16 when the first protruding portion 31 illustrated in FIG. 10 is inserted into the first recessed-portion insertion portion 321. Under a state in which the first protruding portion 31 is inserted into the first recessed-portion insertion portion 321, the first magnet 181 and the second magnet 191 having the same polarity are completely adjacent to each other in the axial direction. Specifically, under the state in which the first protruding portion 31 is inserted into the first recessed-portion insertion portion 321, the first magnet 181 and the second magnet 191 having the same polarity are present in the same phase position in the circumferential direction. Therefore, after the first protruding portion 31 is inserted into the first recessed-portion insertion portion 321, the second magnet 201 of the S pole is opposed to the first magnet 181 of the S pole in the axial direction, and the second magnet 201 of the N pole is opposed to the first magnet 181 of the N pole in the axial direction. In FIG. 11, the second magnets 201 are not illustrated in FIG. 11 because the second magnets 201 are hidden behind the first magnets 181.

Meanwhile, under the state in which the first protruding portions 31 are inserted into the first recessed-portion insertion portions 321, positions of the first bolt insertion holes 21 and a position of the keyway 13 of the first core member 17 are shifted in the circumferential direction by the skew mechanical angle α° with respect to positions of the threaded holes 22 and a position of the keyway 13 of the second core member 19, respectively.

Thereafter, the first rotor member 15 is rotated with respect to the second rotor member 16 in a direction in which the first protruding-portion engagement portions 311 are fitted into the first recessed-portion engagement portions 322, specifically, in a direction indicated by the arrow B1 in FIG. 10. In this manner, the first protruding-portion engagement portions 311 are fitted into the first recessed-portion engagement portions 322, and the first protruding portions 31 are engaged with the first recessed portions 32 in the circumferential direction and the radial direction.

Figure 12:
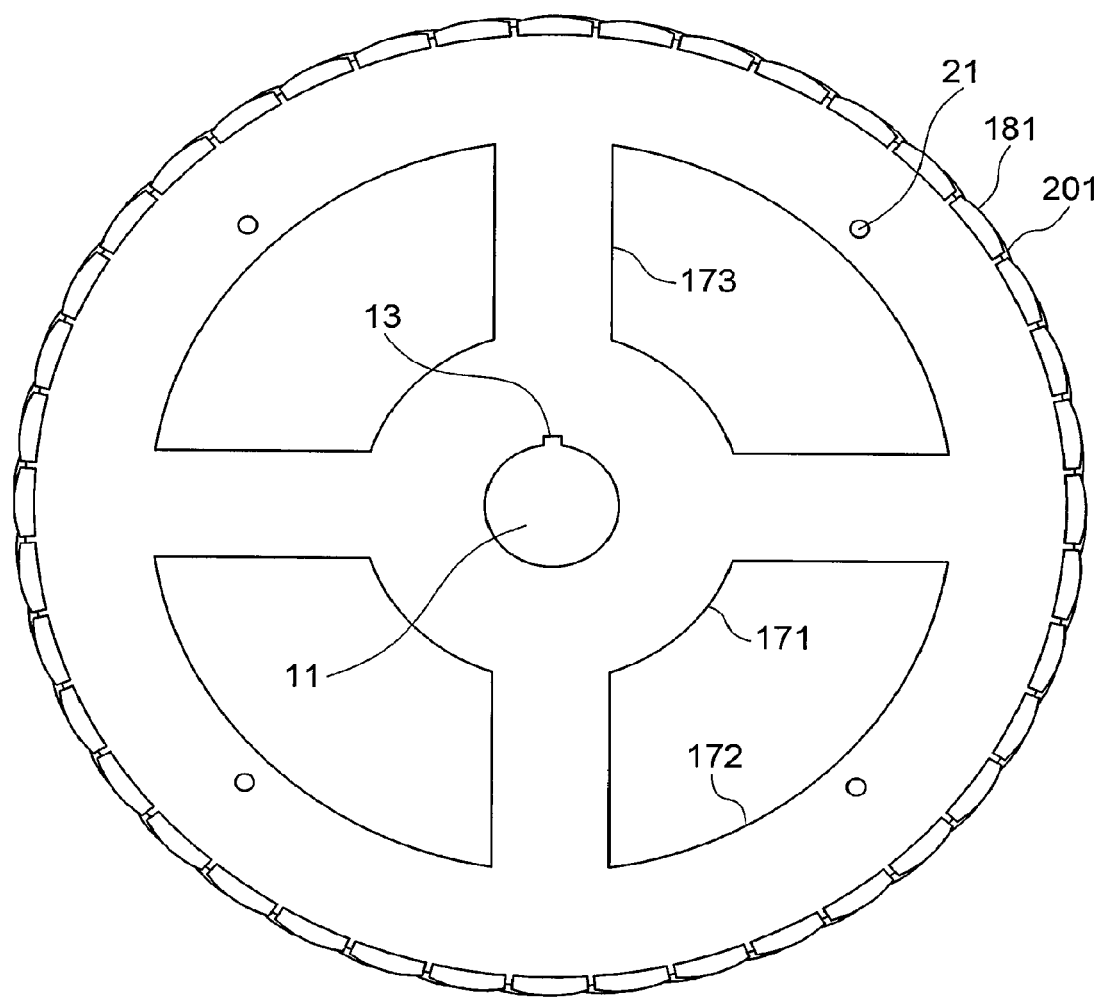
FIG. 12 is a front view for illustrating a circumferential positional relationship between the first rotor member and the second rotor member when first protruding-portion engagement portions illustrated in FIG. 10 are fitted in first recessed-portion engagement portions.

FIG. 12 is a front view for illustrating a circumferential positional relationship between the first rotor member 15 and the second rotor member 16 when the first protruding-portion engagement portions 311 illustrated in FIG. 10 are fitted into the first recessed-portion engagement portions 322. When the first rotor member 15 is rotated with respect to the second rotor member 16 in the direction in which the first protruding-portion engagement portions 311 are fitted into the first recessed-portion engagement portions 322, the first magnets 181 are shifted with respect to the second magnets 201 in the circumferential direction. In this manner, there is formed a step skew structure in which the magnetic poles of the first rotor member 15 are shifted with respect to the magnetic poles of the second rotor member 16 in the circumferential direction.

After the first protruding-portion engagement portions 311 are fitted into the first recessed-portion engagement portions 322 to engage the first protruding portions 31 with the first recessed portions 32, the first rotor member 15 is positioned with respect to the second rotor member 16 in both of the circumferential direction and the radial direction. At this time, the first magnets 181 receive a magnetic repulsive force in the circumferential direction from the second magnets 201 of the same polarity, and receive a magnetic attractive force in the circumferential direction from the second magnets 201 of the opposite polarity. Specifically, the first protruding portions 31 are shifted in the direction indicated by the arrow B1 in FIG. 10. As a result, the first magnets 181 of the N pole receive the magnetic repulsive force in the circumferential direction from the second magnets 201 of the N pole and receive the magnetic attractive force in the circumferential direction from the second magnets 201 of the S pole, and the first magnets 181 of the S pole receive the magnetic repulsive force in the circumferential direction from the second magnets 201 of the S pole and receive the magnetic attractive force in the circumferential direction from the second magnets 201 of the N pole. In this manner, circumferential components of the magnetic repulsive force and the magnetic attractive force which are generated between the first magnets 181 and the second magnets 201 are applied in the direction in which the first protruding portions 31 are brought into engagement with the first recessed portions 32 so as to retain a state in which the first protruding portions 31 are engaged with the first recessed portions 32.

Further, after the first protruding portions 31 are engaged with the first recessed portions 32, the first core member 17 is positioned with respect to the second core member 19 in both of the circumferential direction and the radial direction. Therefore, the shaft hole 11 of the first core member 17 and the shaft hole 11 of the second core member 19 are positioned coaxially, while the position of the keyway 13 of the first core member 17 and the position of the keyway 13 of the second core member 19 match with each other in the circumferential direction and the radial direction. Further, at this time, the positions of the first bolt insertion holes 21 also match with positions of the threaded holes 22 in the circumferential direction and the radial direction.

In FIG. 12, an area of the first magnet 181, which is opposed to the second magnet 201 of the same polarity, is larger than an area of the first magnet 181, which is opposed to the second magnet 201 of the opposite polarity. Therefore, the magnetic repulsive force is generated in the axial direction as a whole between the first rotor member 15 and the second rotor member 16.

Therefore, after the first rotor member 15 is rotated with respect to the second rotor member 16 to engage the first protruding portions 31 with the second recessed portions 32, the bolts 23 are inserted into the first bolt insertion holes 21 of the first core member 17 to mount the bolts 23 into the threaded holes 22 of the second core member 19 so that the first rotor member 15 and the second rotor member 16 are not partitioned. Thereafter, the bolts 23 are fastened to fix the first core member 17 and the second core member 19 to each other under the state in which the side surface 17a of the first core member 17 and the side surface 19a of the second core member 19 are held in contact with each other. In this manner, the rotor 4 is completed.

Thereafter, the rotary shaft 3 is fitted into the shaft hole 11 of the rotor 4 while a circumferential position of the keyway 12 of the rotary shaft 3 and circumferential positions of the keyways 13 of the shaft holes 11 are caused to match with each other. Thereafter, the key is inserted into a space formed between the keyway 12 and the keyways 13. In this manner, the rotor 4 is positioned in the circumferential direction with respect to the rotary shaft 3, to thereby fix the rotor 4 to the rotary shaft 3.

In the rotor 4 described above, the first protruding portions 31 are formed on the first core member 17, and the first recessed portions 32 with which the first protruding portions 31 are engaged in the circumferential direction are formed in the second core member 19. Each of the first recessed portions 32 has the first recessed-portion engagement portion 322, and each of the first protruding portions 31 has the first protruding-portion engagement portion 311 to be fitted into the first recessed-portion engagement portion 322. Therefore, through engagement of the first protruding portions 31 with the first recessed portions 32 in the circumferential direction, the first rotor member 15 can be positioned accurately and easily with respect to the second rotor member 16 in the circumferential direction and the radial direction. Further, the first magnet 181 and the second magnet 201 which are adjacent to each other and have the same polarity are shifted by the certain angle in the circumferential direction. Therefore, the circumferential components of the magnetic repulsive force and the magnetic attractive force which are generated between the first magnets 181 and the second magnets 201 can be increased. Thus, an engaged state between the first protruding portions 31 and the first recessed portions 32 can be more reliably retained. Based on the above-mentioned fact, an operation of assembling the first rotor member 15 and the second rotor member 16 can be easily performed. Thus, productivity of the rotor 4 can be improved. Further, through the engagement of the first protruding portions 31 with the first recessed portions 32 in the circumferential direction, burden on the bolts 23 which fasten the first rotor member 15 and the second rotor member 16 to each other can be reduced. As a result, the number of bolts 23 can be reduced. In this manner, labor for an operation of fastening the bolts 23 can be reduced. Further, the number of first bolt insertion holes 21 and the number of threaded holes 22 can also be reduced. Thus, strength of the first core member 17 and the second core member 19 can also be easily secured.

Figure 13:
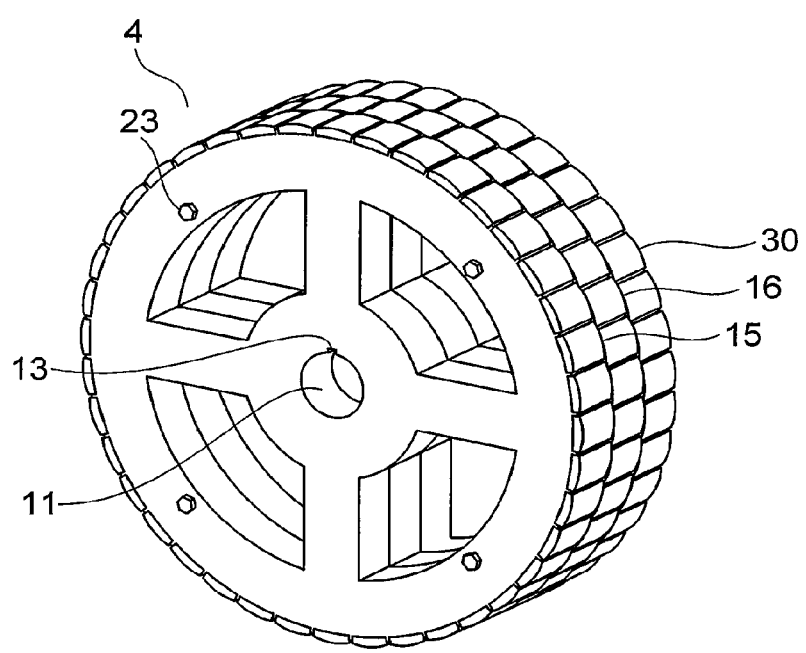
FIG. 13 is a perspective view for illustrating another example of the rotor according to the first embodiment of the present invention.

In the example described above, two rotor members as the first rotor member 15 and the second rotor member 16 are fixed to each other under a state of being aligned in the axial direction. However, as illustrated in FIG. 13, three or more rotor members as the first rotor member 15, the second rotor member 16, and one or more additional rotor member 30 may be fixed to each other under a state of being aligned in the axial direction. In this case, a structure of the additional rotor member 30 is similar to that of the first rotor member 15. The first protruding portions 31 are formed on one of core members of the respective rotor members adjacent to each other, and the first recessed portions 32 are formed on another thereof. Further, in this case, magnets included in a magnet group of the additional rotor member 30 are shifted by a certain angle in the circumferential direction with respect to the second magnets 201 of the second rotor member 16. In this manner, a step skew structure having three or more rows is formed.

Second Embodiment

Figure 14:
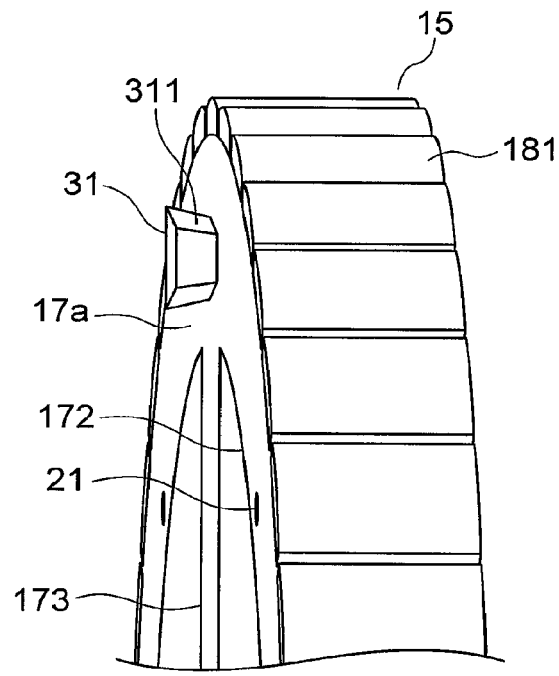
FIG. 14 is a perspective view for illustrating main portions of the first protruding portion of the rotor for the rotary electric machine according to a second embodiment of the present invention.

FIG. 14 is a perspective view for illustrating main portions of the first protruding portion 31 of the rotor for the rotary electric machine according to a second embodiment of the present invention. In each of the first protruding portions 31 projecting from the side surface 17a of the first core member 17, the width of the first protruding-portion engagement portion 311 continuously increases toward an end portion of the first protruding portion 31 in the projecting direction thereof. Specifically, a sectional shape of each of the first protruding-portion engagement portions 311 on a plane along the radial direction of the rotor 4 is a tapered shape which continuously expands toward the end portion of the first protruding portion 31 in the projecting direction thereof, specifically, an upper end portion of the first protruding portion 31 in a height direction thereof.

Figure 15:
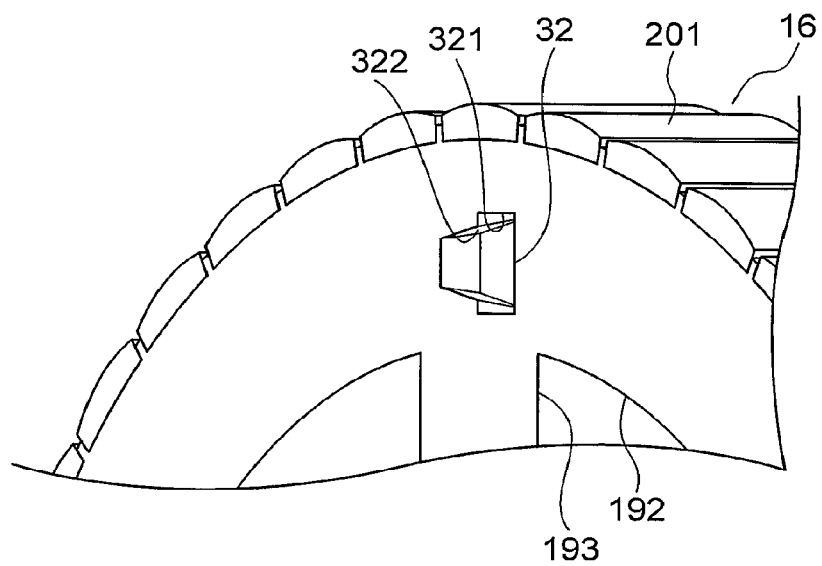
FIG. 15 is a perspective view for illustrating main portions of the first recessed portion of the rotor for the rotary electric machine according to the second embodiment of the present invention.

FIG. 15 is a perspective view for illustrating main portions of the first recessed portion 32 of the rotor for the rotary electric machine according to the second embodiment of the present invention. In the first recessed portion 32, the width of the first recessed-portion insertion portion 321 is constant at any position in the depth direction of the first recessed portion 32. Further, in the first recessed portion 32, the width of the first recessed-portion engagement portion 322 continuously increases toward a bottom surface of the first recessed portion 32 in the depth direction thereof. Specifically, a sectional shape of the first recessed-portion insertion portion 321 on the plane alone the radial direction of the rotor 4 is a rectangular shape having the constant width, and a sectional shape of the first recessed-portion engagement portion 322 on the plane along the radial direction of the rotor 4 is a tapered shape which continuously expands toward the bottom surface of the first recessed portion 32 in the depth direction thereof.

In this manner, under a state in which the first protruding-portion engagement portion 311 is fitted into the first recessed-portion engagement portion 322, the first protruding-portion engagement portion 311 and an inner surface of the first recessed-portion engagement portion 322 are engaged with each other not only in the circumferential direction and the radial direction of the rotor 4 but also in the axial direction thereof. As a result, the first core member 17 is prevented from coming off the second core member 19 in the axial direction. Other configurations are similar to those of the first embodiment.

A procedure of assembling the first rotor member 15 and the second rotor member 16 to each other is also similar to that of the first embodiment. Specifically, after the first protruding portions 31 are inserted into the first recessed-portion insertion portions 321 while the first rotor member 15 is brought closer to the second rotor member 16 in the same direction as that indicated by the arrow A1 in FIG. 10, the first rotor member 15 is rotated with respect to the second rotor member 16 in the direction in which the first protruding-portion engagement portions 311 are fitted into the first recessed-portion engagement portions 322, specifically, in the same direction as that indicated by the arrow B1 in FIG. 10. In this manner, the first protruding-portion engagement portions 311 are fitted into the first recessed-portion engagement portions 322. The sectional shape of each of the first protruding-portion engagement portions 311 is the tapered shape which expands toward the end portion of the first protruding portion 31 in the projecting direction thereof. The sectional shape of each of the first recessed-portion engagement portions 322 is the tapered shape which expands toward the bottom surface of the first recessed portion 322 in the depth direction thereof. Thus, when the first protruding-portion engagement portions 311 are fitted into the first recessed-portion engagement portions 322, the first protruding portions 31 are engaged with the first recessed portions not only in the circumferential direction and the radial direction of the rotor 4 but also in the axial direction thereof.

Under the state in which the first protruding portions are engaged with the first recessed portions 32, the circumferential components of the magnetic repulsive force and the magnetic attractive force which are generated between the first magnets 181 and the second magnets 201 are applied in the direction in which the first protruding portions 31 are brought into engagement with the first recessed portions 32 as in the first embodiment. Therefore, the engaged state between the first protruding portions 31 and the first recessed portions 32 is retained. Further, the area of the first magnet 181, which is opposed to the second magnet 201 of the same polarity, is larger than the area of the first magnet 181, which is opposed to the second magnet 201 of the opposite polarity. Therefore, the magnetic repulsive force is generated in the axial direction as a whole between the first rotor member 15 and the second rotor member 16. The magnetic repulsive force is applied in the direction in which the first protruding portions 31 are brought into engagement with the first recessed portions 32. As a result, the state in which the first protruding portions 31 are engaged with the first recessed portion 32 is retained.

Thereafter, the bolts 23 are inserted into the first bolt insertion holes 21 of the first core member 17. Then, the bolts 23 are mounted into the threaded holes 22 of the second core member 19, and the bolts 23 are fastened, to thereby fasten the first core member 17 and the second core member 19 to each other. In this manner, the rotor 4 is completed.

Thereafter, the rotary shaft 3 is fitted into the shaft hole 11 of the rotor 4 while the circumferential position of the keyway 12 of the rotary shaft 3 and the circumferential positions of the keyways 13 of the shaft holes 11 are caused to match with each other. Then, the key is fitted into the space formed between the keyway 12 and the keyways 13. In this manner, the rotor 4 is positioned in the circumferential direction with respect to the rotary shaft 3, and hence the rotor 4 is fixed to the rotary shaft 3.

In the rotor 4 described above, the width of the first protruding-portion engagement portion 311 increases toward the end portion of the first protruding portion 31 in the projecting direction thereof, and the width of the first recessed-portion engagement portion 322 increases toward the bottom surface of the first recessed portion 32 in the depth direction thereof. Therefore, as a result of fitting of the first protruding-portion engagement portions 311 into the first recessed-portion engagement portions 322, the first protruding portions 31 can be engaged with the first recessed portions 32 not only in the circumferential direction and the radial direction of the rotor 4 but also in the axial direction thereof. In this manner, the first core member 17 can be positioned more reliably and easily with respect to the second core member 19. As a result, the productivity of the rotor 4 can be more improved. Further, the operation of fastening the bolts 23 can be further alleviated by reducing the number of bolts 23. The strength of the first core member 17 and the second core member 19 can be further secured by reducing the number of first bolt insertion holes 21 and the number of threaded holes 22.

In the example described above, the first core member 17 and the second core member 19 are fixed to each other by fastening the bolts 23. However, the first core member 17 can be prevented from coming off the second core member 19 in the axial direction by fitting the first protruding-portion engagement portions 311 into the first recessed-portion engagement portions 322. Thus, the bolts 23 may be omitted. In this manner, the number of components can be reduced, and hence the productivity of the rotor 4 can be further improved.

Third Embodiment

Figure 16:
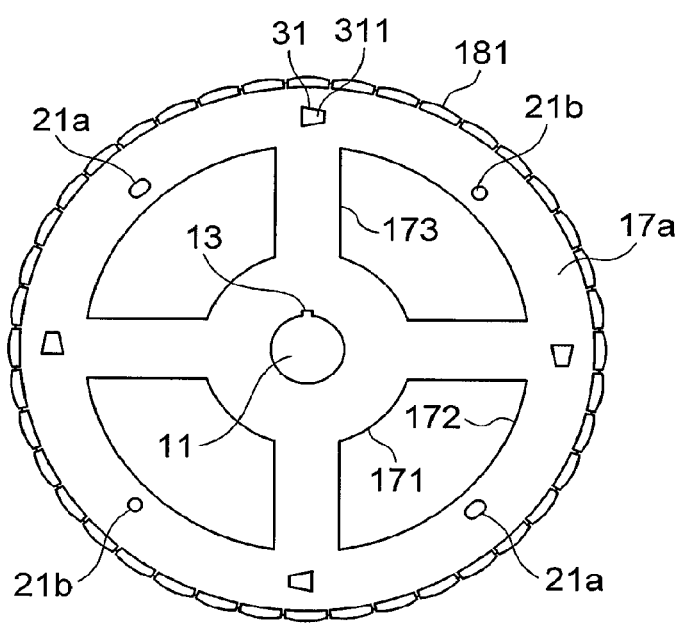
FIG. 16 is a back view for illustrating the first rotor member as viewed from the second rotor member side in the rotor for the rotary electric machine according to a third embodiment of the present invention.

FIG. 16 is a back view for illustrating the first rotor member 15 in the rotor for the rotary electric machine according to a third embodiment of the present invention as viewed from the second rotor member 16 side. At least any one of the plurality of first bolt insertion holes 21 formed in the outer annular portion 172 of the first core member 17 is formed as an elongated hole 21a extending along the circumferential direction of the rotor 4. In this example, two first bolt insertion holes 21 of the four first bolt insertion holes 21, which are present at symmetric positions with respect to the axis of the rotor 4, are formed as the elongated holes 21a, and another two first bolt insertion holes 21 are formed as circular holes 21b.

A circumferential position of each of the circular holes 21b is set to a position which matches with a circumferential position of the threaded hole 22 under the state in which the first protruding portions 31 are inserted into the first recessed-portion insertion holes 321 and is shifted from the circumferential position of the threaded hole 22 under the state in which the first protruding-portion engagement portions 311 are fitted into the first recessed-portion engagement portions 322.

A circumferential range of each of the elongated holes 21a is set so that the circumferential position of the threaded hole 22 falls within the circumferential range of the elongated hole 21a both under the state in which the first protruding portions 31 are inserted into the first recessed-portion insertion portions 321 and under the state in which the first protruding-portion engagement portions 311 are fitted into the first recessed-portion engagement portions 322. The first core member 17 and the second core member 19 are fastened to each other by the bolts 23 inserted into the elongated holes 21a. Other configurations are similar to those of the first embodiment.

Figure 17:
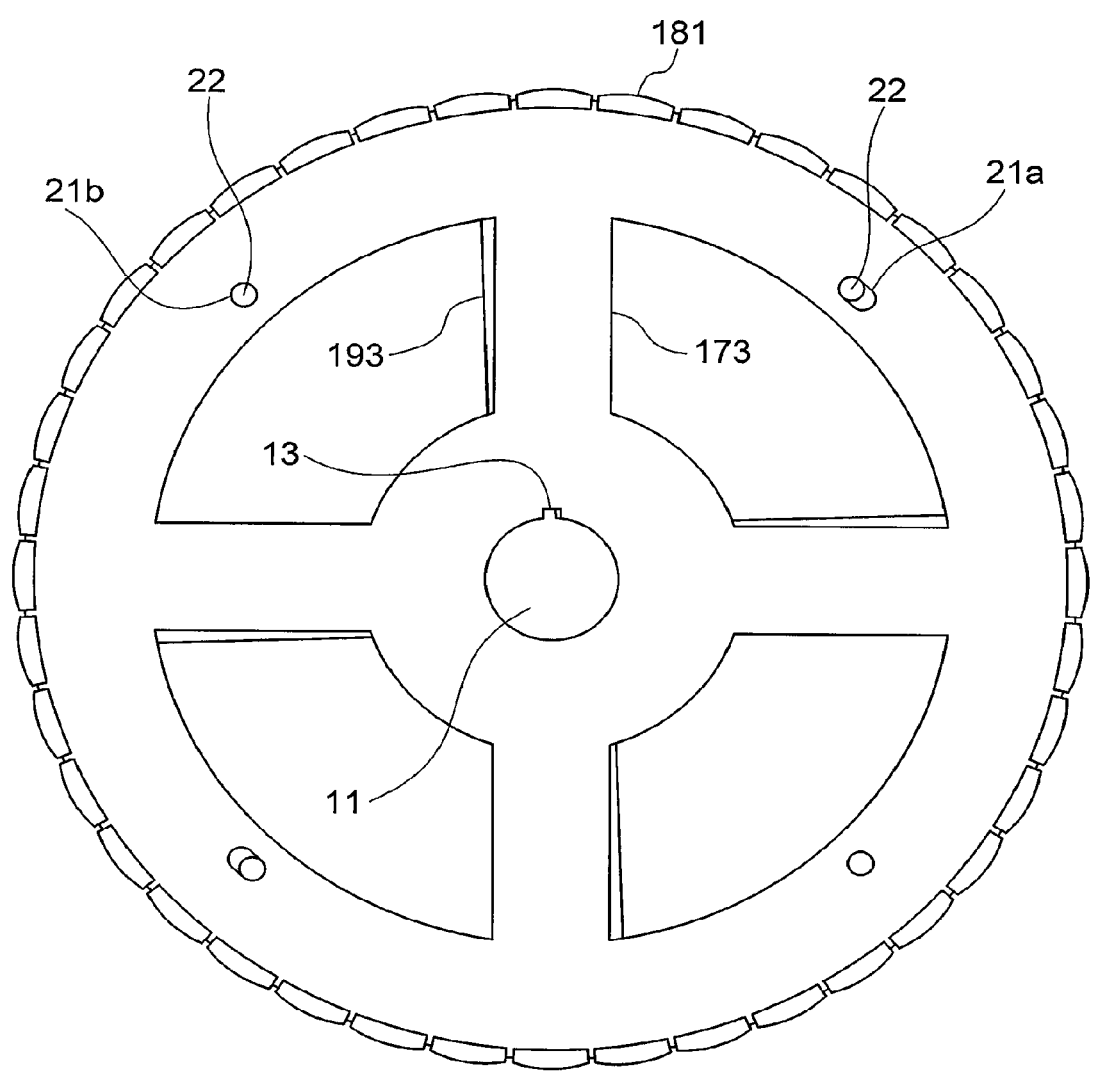
FIG. 17 is a front view for illustrating a positional relationship between the first rotor member and the second rotor member when the first protruding portions are at positions of being inserted into first recessed-portion insertion portions in the third embodiment of the present invention.

FIG. 17 is a front view for illustrating a positional relationship between the first rotor member 15 and the second rotor member 16 when the first protruding portions 31 are at positions of being inserted into the first recessed-portion insertion portions 321 in the third embodiment of the present invention. When the first rotor member 15 and the second rotor member 16 are assembled to each other, the circumferential positions of the elongated holes 21a and the circumferential positions of the circular holes 21b are first aligned with the circumferential positions of the threaded holes 22 under the state in which the side surface 17a of the first core member 17 and the side surface 19a of the second core member 19 are opposed to each other through a gap therebetween. Thereafter, the bolts 23 are inserted into the elongated holes 21a and the circular holes 21b so that the bolts 23 are mounted into the threaded holes 22. In this manner, the first protruding portions 31 are opposed to the first recessed-portion insertion portions 321 in the axial direction so that the first protruding portions 31 can be inserted into the first recessed-portion insertion portions 321. Under this state, as illustrated in FIG. 17, the position of the first magnet 181 and the position of the second magnet 201 of the same polarity match with each other in the circumferential direction, and the keyway 13 of the first core member 17 is shifted by the skew mechanical angle $\alpha°$ with respect to the keyway 13 of the second core member 19 in the circumferential direction.

Thereafter, the bolts 23 are screwed into the threaded holes 22 against the magnetic repulsive force generated between the first magnets 181 and the second magnets 201, to thereby displace the first core member 17 toward the second core member 19 until the first core member 17 is brought into contact with the second core member 19. Specifically, the bolts 23 are used as jack bolts so that the first core member 17 is displaced toward the second core member 19 against the magnetic repulsive force generated between the first magnets 181 and the second magnets 201. In this manner, the first protruding portions 31 are inserted into the recessed-portion insertion portions 321.

Thereafter, the bolts 23 inserted into the circular holes 21b are removed, and the bolts 23 inserted into the elongated holes 21a are slightly loosened. In this manner, the first rotor member 15 becomes rotatable with respect to the second rotor member 16.

Thereafter, the first rotor member 15 is rotated with respect to the second rotor member 16 in the direction in which the first protruding-portion engagement portions 311 are fitted into the first recessed-portion engagement portions 322. At this time, the first core 17 is guided along the elongated holes 21a by the bolts 23 mounted into the threaded holes 22, while the circumferential components of the magnetic repulsive force and the magnetic attractive force which are generated between the first magnets 181 and the second magnets 201 aid in rotating the first rotor member 15. As a result, the first protruding-portion engagement portions 311 are fitted into the first recessed-portion engagement portions 322 to engage the first protruding portions 31 with the first recessed portions 32. In this manner, the first rotor member 15 is positioned with respect to the second rotor member 16 in the circumferential direction and the radial direction.

Figure 18:
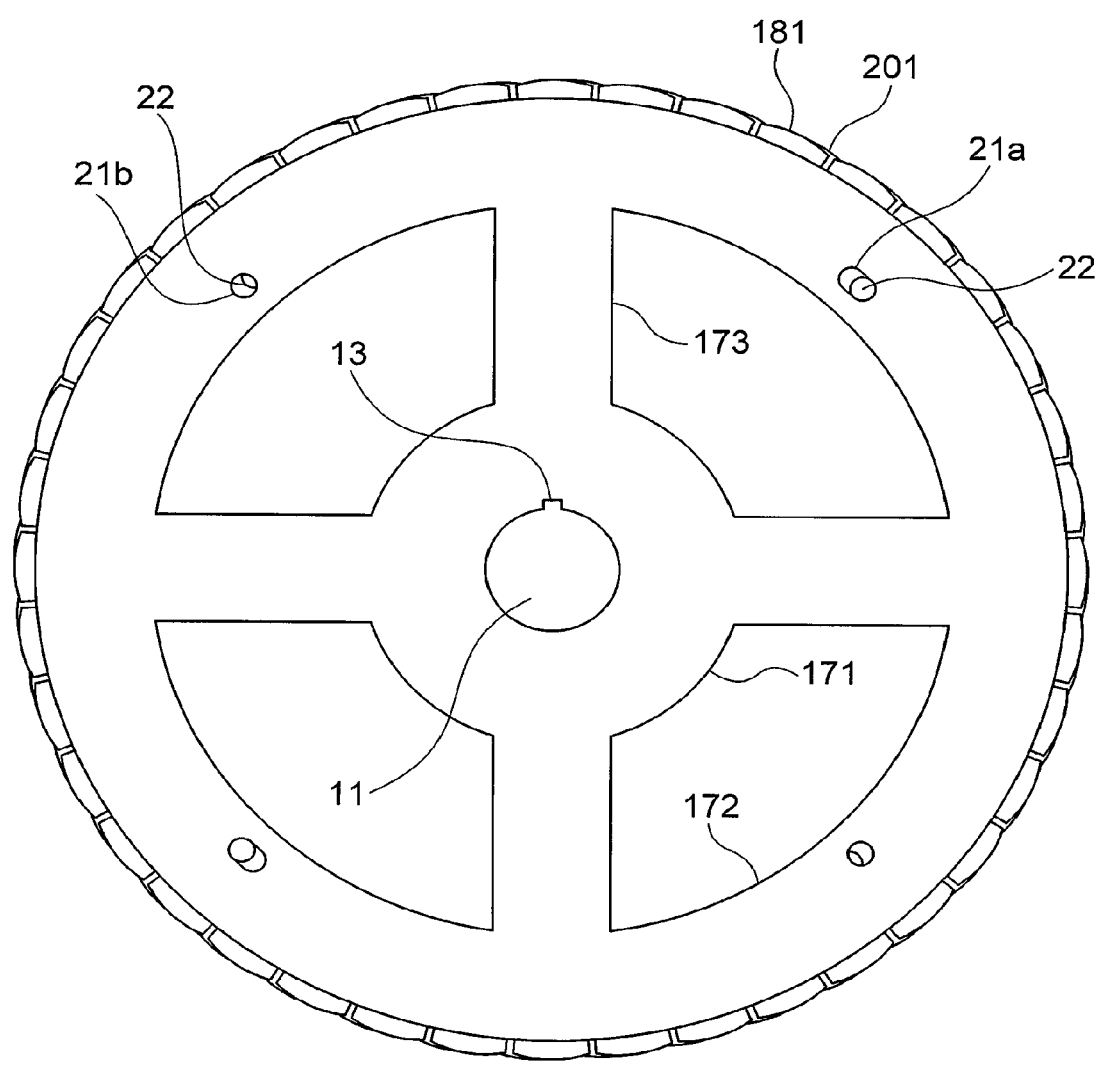
FIG. 18 is a front view for illustrating a positional relationship between the first rotor member and the second rotor member when the first protruding portions are engaged with the first recessed portions of the third embodiment of the present invention.

FIG. 18 is a front view for illustrating a positional relationship between the first rotor member 15 and the second rotor member 16 when the first protruding portions 31 are engaged with the first recessed portions 32 of the third embodiment of the present invention. Under the state in which the first protruding portions 31 are engaged with the first recessed portions 32, positions of the circular holes 21b are shifted with respect to positions of the threaded hole 22 in the circumferential direction. Further, under this state, a position of one of the first magnet 181 and the second magnet 201 of the same polarity is shifted by the skew mechanical angle α° in the circumferential direction with respect to a position of another thereof, while the position of the keyway 13 of the first core member 17 and the position of the keyway 13 of the second core member 19 match with each other in the circumferential direction and the radial direction.

Under this state, the bolts 23 inserted into the elongated holes 21a are tightened. As a result, the first rotor member 15 and the second rotor member 16 are fastened to each other also in the axial direction, to thereby complete the rotor 4.

A subsequent procedure of fixing the rotor 4 to the rotary shaft 3 is similar to that of the first embodiment.

In the rotor 4 described above, at least anyone of the plurality of first bolt insertion holes 21 is formed as the elongated hole 21a extending along the circumferential direction. The first core member 17 and the second core member 19 are fastened to each other by the bolts 23 inserted into the elongated holes 21a. Thus, the first protruding-portion engagement portions 311 can be fitted into the first recessed-portion engagement portions 322 by rotating the first rotor member 15 with respect to the second rotor member 16 while the bolts 23 inserted into the elongated holes 21a remain mounted into the threaded holes 22 of the second core member 19. Further, through screwing of the bolts 23 inserted into the elongated holes 21a into the threaded holes 22, the first rotor member 15 can be displaced toward the second rotor member 16.

When the side surface 17a of the first core member 17 is brought closer to the side surface 19a of the second core member 19, the magnetic repulsive force is generated between the first magnets 181 and the second magnets 201. When each of the first rotor member 15 and the second rotor member 16 is increased in size, a size and the number of the first magnets 181 and a size and the number of the second magnets 201 increase. Therefore, the magnetic repulsive force which are generated between the first magnets 181 and the second magnets 201 increases. As a result, the operation of assembling the first core member 15 and the second core member 16 becomes more difficult.

In the third embodiment, even when the magnetic repulsive force generated between the first magnets 181 and the second magnets 201 increases, the first rotor member 15 can be displaced toward the second rotor member 16 against the magnetic repulsive force by screwing the bolts 23 inserted into the elongated holes 21a into the threaded holes 22. Further, even under a state in which the first and second rotor member 15 receives the magnetic repulsive force, the first protruding-portion engagement portions 311 can be fitted into the first recessed-portion engagement portions 322 by rotating the first rotor member 15 with respect to the second rotor member 16. In this manner, the operation of assembling the first rotor member 15 and the second rotor member 16 can be easily performed. As a result, the productivity of the rotor 4 can be further improved.

In the example described above, two of the four first bolt insertion holes 21 are formed as the elongated holes 21a, and another two first bolt insertion holes 21 are formed as the circular holes 21b. However, the number of elongated holes 21a may be set to one or three or more. Further, the number of circular holes 21b is not limited to two. Still further, the circular holes 21b may be omitted from the first core member 17.

Further, in the example described above, the circumferential position of each of the circular holes 21b is set so as to match with the circumferential position of the threaded hole 22 under the state in which the first protruding portions 31 are inserted into the first recessed-portion insertion portions 321 and to be shifted from the circumferential position of the threaded hole 22 under the state in which the first protruding-portion engagement portions 311 are fitted into the first recessed-portion engagement portions 322. However, the circumferential position of each of the circular holes 21b may be set so as to be shifted from the circumferential position of the threaded hole 22 under the state in which the first protruding portions 31 are inserted into the first recessed-portion insertion portions 321 and to match with the circumferential position of the threaded hole 22 under the state in which the first protruding-portion engagement portions 311 are fitted into the first recessed-portion engagement portions 322. In this case, only the bolts 23 inserted into the elongated holes 21a are screwed into the threaded holes 22 in advance under the state in which the first protruding portions 31 are inserted into the first recessed-portion insertion portions 321. After the first protruding-portion engagement portions 311 are fitted into the first recessed-portion engagement portions 322, the bolts 23 are inserted into the circular holes 21b so that the bolts 23 are screwed into the threaded holes 22. In this manner, the number of bolts 23 which fix the first core member 17 to the second core member 19 can be increased.

Fourth Embodiment

Figure 19:
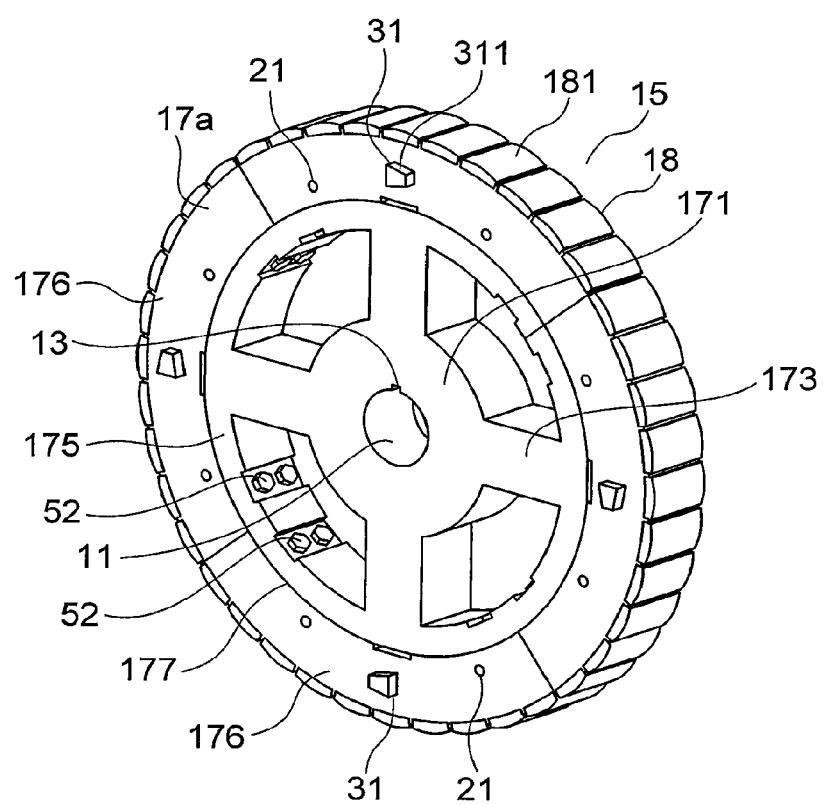
FIG. 19 is a perspective view for illustrating the first rotor member in the rotor for the rotary electric machine according to a fourth embodiment of the present invention.

FIG. 19 is a perspective view for illustrating the first rotor member 15 in the rotor for the rotary electric machine according to a fourth embodiment of the present invention. The outer annular portion 172 of the first core member 17 includes an inner ring portion 175 and a plurality of arc-shaped core blocks 176. The inner ring portion 175 surrounds the boss portion 171. The plurality of arc-shaped core blocks 176 are mounted to an outer peripheral portion of the inner ring portion 175. In this example, four arc-shaped core blocks 176 divided equally in the circumferential direction of the rotor 4 surround the inner ring portion 175 under a state in which the four arc-shaped core blocks 176 are arrayed in the circumferential direction of the first core member 17 without any gap. Further, the boss portion 171, the ribs 173, and the inner ring portion 175 are formed of a single member to form a main body core block 177. Specifically, the first core member 17 is a core assembly member which includes the main body core block 177 and the plurality of arc-shaped core blocks 176 as a plurality of divided core blocks. The main body core block 177 includes the boss portion 171, the plurality of ribs 173, and the inner ring portion 175. The plurality of arc-shaped core blocks 176 are mounted to the outer peripheral portion of the main body core block 177. The first protruding portion 31 and the first bolt insertion holes 21 are formed on each of the arc-shaped core blocks 176.

The plurality of first magnets 181 are mounted to each of the arc-shaped core blocks 176 so as to be arrayed in the circumferential direction. In this example, the same number of first magnets 181 are mounted to each of the arc-shaped core blocks 176. The first magnet group 18 is formed by mounting the arc-shaped core blocks 176 to the inner ring portion 175 under a state in which the arc-shaped core blocks 176 are arrayed in the circumferential direction.

Figure 20:
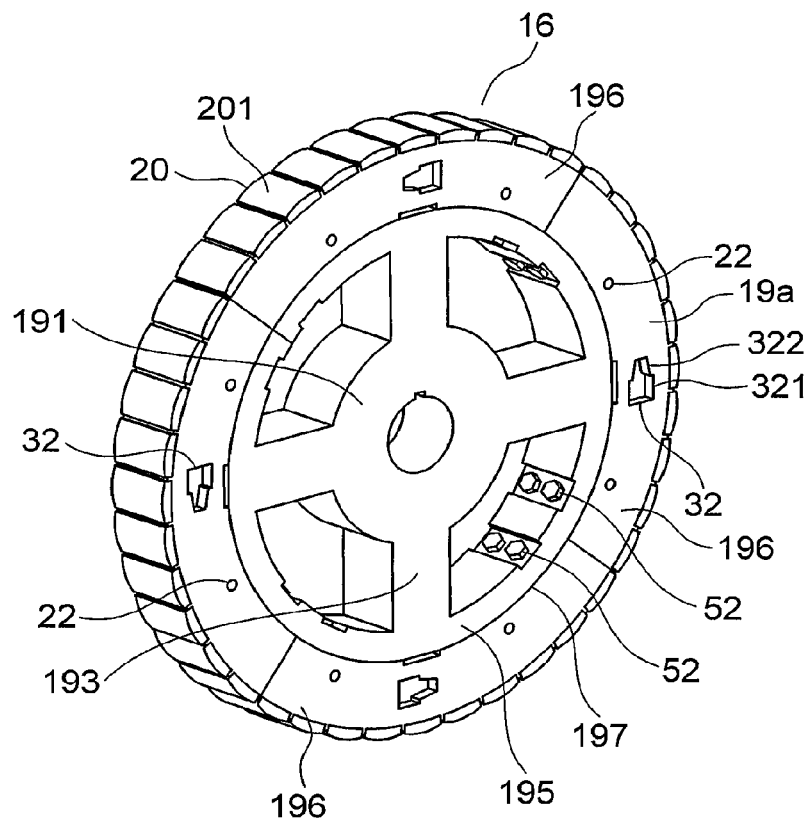
FIG. 20 is a perspective view for illustrating the second rotor member in the rotor for the rotary electric machine according to the fourth embodiment of the present invention.

FIG. 20 is a perspective view for illustrating the second rotor member 16 in the rotor for the rotary electric machine according to the fourth embodiment of the present invention. The outer annular portion 192 of the second core member 19 includes an inner ring portion 195 and a plurality of arc-shaped core blocks 196. The inner ring portion 195 surrounds the boss portion 191. The plurality of arc-shaped core blocks 196 are mounted to an outer peripheral portion of the inner ring portion 195. In this example, four arc-shaped core blocks 196 divided equally in the circumferential direction of the rotor 4 surround the inner ring portion 195 under a state in which the four arc-shaped core blocks 196 are arrayed in the circumferential direction of the second core member 19 without any gap. Further, the boss portion 191, the ribs 193, and the inner ring portion 195 are formed of a single member to form a main body core block 197. Specifically, the second core member 19 is a core assembly member which includes the main body core block 197 and the plurality of arc-shaped core blocks 196 as a plurality of divided core blocks. The main body core block 197 includes the boss portion 191, the plurality of ribs 193, and the inner ring portion 195. The plurality of arc-shaped core blocks 196 are mounted to the outer peripheral portion of the main body core block 197. The first recessed portion 32 and the threaded holes 22 are formed in each of the arc-shaped core blocks 196.

The plurality of second magnets 201 are mounted to each of the arc-shaped core blocks 196 so as to be arrayed in the circumferential direction. In this example, the same number of second magnets 201 are mounted to each of the arc-shaped core blocks 196. The second magnet group 20 is formed by mounting the arc-shaped core blocks 196 to the inner ring portion 195 under a state in which the arc-shaped core blocks 196 are arrayed in the circumferential direction.

Figure 21:
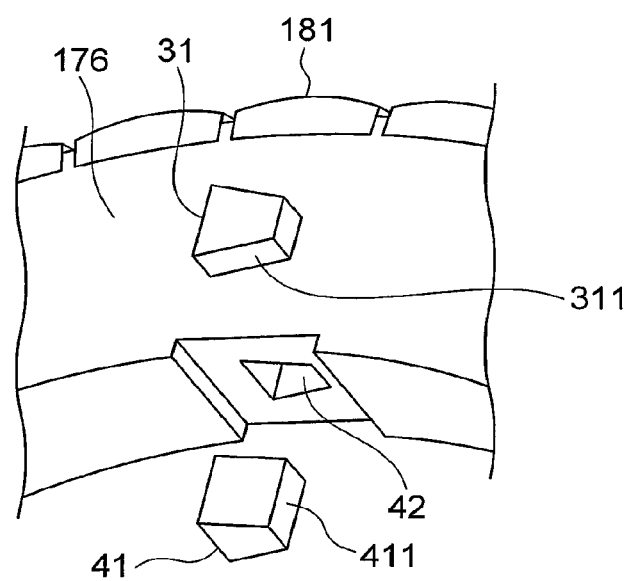
FIG. 21 is a perspective view for illustrating an inner peripheral portion of an arc-shaped core block illustrated in FIG. 19.

FIG. 21 is a perspective view for illustrating an inner peripheral portion of the arc-shaped core block 176 illustrated in FIG. 19. On an inner peripheral surface of each of the arc-shaped core blocks 176, a tapered block projecting toward the main body core block 177 is fixed as a second protruding portion 41. The second protruding portion 41 being the tapered block is a member which is formed separately from the arc-shaped core block 176. In the inner peripheral surface of each of the arc-shaped core blocks 176, a fitting hole 42 is formed. The second protruding portion 41 is press-fitted into the fitting hole 42 to be fixed to the arc-shaped core block 176.

Figure 22:
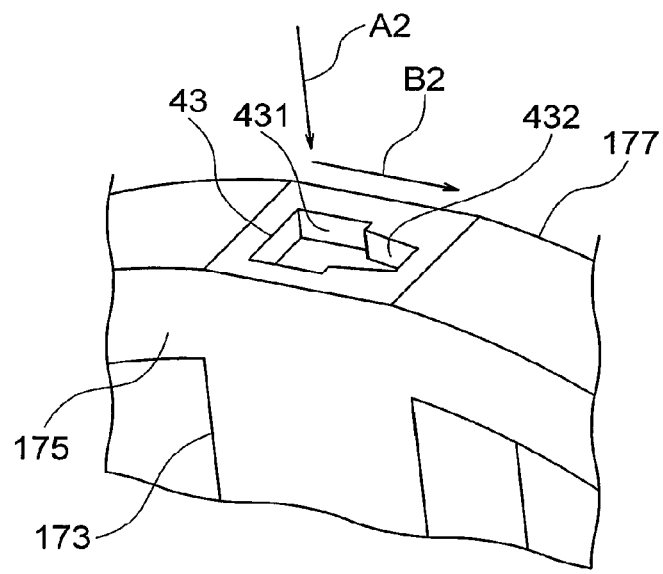
FIG. 22 is a perspective view for illustrating an outer peripheral portion of a main body core block illustrated in FIG. 19.

FIG. 22 is a perspective view for illustrating an outer peripheral portion of the main body core block 177 illustrated in FIG. 19. On an outer peripheral surface of the main body core block 177, the same number of second recessed portions 43 as the number of second protruding portions 41 of the arc-shaped core blocks 176 are formed. The second recessed portions 43 are formed in the outer peripheral surface of the main body core block 177 so as to match with circumferential positions of the second protruding portions 41.

The second protruding portions 41 are inserted into the second recessed portions 43 and are engaged with the second recessed portion 43 in the same direction in which the first protruding portion 31 is brought into engagement with the first recessed portion 32 in the circumferential direction of the rotor 4. The second protruding portions 41 are engaged with the second recessed portions 43 while taking the same orientation in the same circumferential direction of the rotor 4.

Each of the second protruding portions 41 has a second protruding-portion engagement portion 411 to be fitted into the second recessed portion 43. A width direction of the second protruding-portion engagement portion 411 matches with the axial direction of the rotor 4. Further, a width of the second protruding-portion engagement portion 411 continuously decreases in the direction in which the second protruding portion 41 is brought into engagement with the second recessed portion 43. Specifically, the second protruding-portion engagement portion 411 has such a tapered shape that a width of the second protruding portion 41 continuously decreases toward one circumferential end portion of the second protruding portion 41.

As illustrated in FIG. 22, each of the second recessed portions 43 has a second recessed-portion insertion portion 431 and a second recessed-portion engagement portion 432 extending from the second recessed-portion insertion portion 431 in the circumferential direction of the rotor 4. A width direction of the second recessed-portion engagement portion 432 matches with the axial direction of the rotor 4.

A size of the second recessed-portion insertion portion 431 is such that the second protruding portion 41 is accommodated therein when the rotor 4 is viewed along the radial direction. In this example, the second recessed-portion insertion portion 431 has a rectangular shape as viewed along the radial direction of the rotor 4.

A width of the second recessed-portion engagement portion 432 continuously decreases in a direction in which the second protruding portion 41 is brought into engagement with the second recessed portion 43. Specifically, the second recessed-portion engagement portion 432 has such a tapered shape that a width of the second recessed portion 43 continuously decreases toward one circumferential end portion of the second recessed portion 43. Positions of the second protruding potions are fixed in the circumferential direction and the axial direction of the rotor 4 with respect to the second recessed portions 43 by fitting of the second protruding-portion engagement portions 411 into the second recessed-portion engagement portions 432.

A width of the second protruding portion 41 in the axial direction of the rotor 4 is constant at any position in a projecting direction of the second protruding portion 41. Further, a width of the second recessed portion 43 in the axial direction of the rotor 4 is constant at any position in a depth direction of the second recessed portion 43.

As a result of fitting of the second protruding-portion engagement portions 411 into the second recessed-portion engagement portions 432 to engage the second protruding portions 41 with the second recessed portions 43, each of the arc-shaped core blocks 176 is positioned in the circumferential direction and the axial direction with respect to the main body core block 177.

Figure 23:
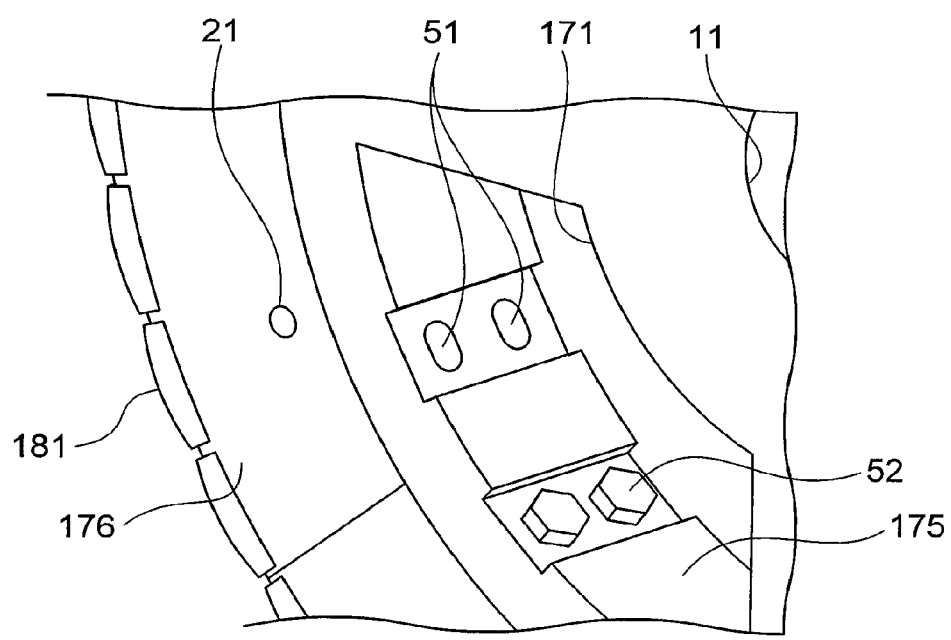
FIG. 23 is an enlarged perspective view for illustrating an inner peripheral surface of an inner ring portion illustrated in FIG. 19.

FIG. 23 is an enlarged perspective view for illustrating an inner peripheral surface of the inner ring portion 175 illustrated in FIG. 19. A plurality of second bolt insertion holes 51 are formed in the inner ring portion 175 of the main body core block 177 so as to match with circumferential positions of the arc-shaped core blocks 176. In this example, two second bolt insertion holes 51 are formed in portions of the inner ring portion 175, which correspond to positions of both circumferential end portions of each of the arc-shaped core blocks 176.

Each of the second bolt insertion holes 51 is a through hole passing through the inner ring portion 175 in the radial direction of the rotor 4. Further, each of the second bolt insertion holes 51 is an elongated hole extending along the circumferential direction of the rotor 4.

A plurality of threaded holes (not shown) are formed in an inner peripheral surface of each of the arc-shaped core blocks 176. A circumferential position of each of the threaded holes is set to fall within a circumferential range of the second bolt insertion hole 51. A bolt 52 inserted into the second bolt insertion hole 51 is mounted into each of the threaded holes of the arc-shaped core blocks 176. Each of the arc-shaped core blocks 176 is fastened to the inner ring portion 175 by the bolts 52 inserted into the second bolt insertion holes 51 under a state in which the second protruding-portion engagement portions 411 are fitted in the second recessed-portion engagement portions 432 to engage the second protruding portions 41 with the second recessed portions 43.

A structure of the second core member 19 is similar to that of the first core member 17. Specifically, the second protruding portions 41 are also fixed to an inner peripheral surface of each of the arc-shaped core blocks 196, and the same number of second recessed portions 43 as the number of second protruding portions 41 of each of the arc-shaped core blocks 196 are formed on an outer peripheral surface of the main body core block 197. Further, even in the second core member 19, the second protruding portions 41 are inserted into the second recessed portions 43 and are engaged with the second recessed portions 43 in the same direction in which the first protruding portions 31 are brought into engagement with the first recessed portions 32 in the circumferential direction of the rotor 4.

As a result of fitting of the second protruding-portion engagement portions 411 into the second recessed-portion engagement portions 432 to engage the second protruding portions 41 with the second recessed portions 43, each of the arc-shaped core blocks 196 is positioned in the circumferential direction and the axial direction with respect to the main body core block 197.

Further, even in the second core member 19, the plurality of second bolt insertion holes 51 which are similar to those of the first core member 17 are formed in the inner ring portion 195 of the main body core block 197. In this example, two second bolt insertion holes 51 are formed in portions of the inner ring portion 195, which correspond to positions of both circumferential end portions of each of the arc-shaped core blocks 196.

Further, even in the second core member 19, a plurality of threaded holes are formed in an inner peripheral surface of each of the arc-shaped core blocks 196. The bolts 52 inserted into the second bolt insertion holes 51 are mounted into the threaded holes. Each of the arc-shaped core blocks 196 is fastened to the inner ring portion 195 by the bolts 52 inserted into the second bolt insertion holes 51 under a state in which the second protruding-portion engagement portions 411 are fitted into the second recessed-portion engagement portions 432 to engage the second protruding portions 41 with the second recessed portions 43. Other configurations are similar to those of the first embodiment.

Next, a procedure of assembling the first rotor member 15 is described. When the first rotor member 15 is to be assembled, as indicated by the arrow A2 in FIG. 22, the second protruding portion 41 of each of the arc-shaped core blocks 176 to which the second protruding portion 41 and the first magnets 181 are mounted in advance is first inserted into the second recessed-portion insertion portion 431. In this manner, all the arc-shaped core blocks 176 are arranged on an outer peripheral surface of the inner ring portion 175 so as to surround the main body core block 177. Thereafter, the bolts 52 are inserted into the second bolt insertion holes 51 so that the bolts 52 are mounted into the threaded holes of the arc-shaped core blocks 176, to thereby temporarily fix the arc-shaped core blocks 176 to the outer peripheral surface of the inner ring portion 175.

Thereafter, the bolts 52 are slightly loosened. Then, all the arc-shaped core blocks 176 are rotated simultaneously in a direction in which the second protruding-portion engagement portions 411 are fitted into the second recessed-portion engagement portions 432, specifically, in a direction indicated by the arrow B2 in FIG. 22 with respect to the main body core block 177. As a result, the second protruding-portion engagement portions 411 are fitted into the second recessed-portion engagement portions 432 to engage the second protruding portions 41 with the second recessed portions 43 in the circumferential direction, to thereby position all the arc-shaped core blocks 176 in the circumferential direction and the axial direction with respect to the main body core block 177. At this time, the arc-shaped core blocks 176 are guided by the bolts 52 along the second bolt insertion holes 51 being the elongated holes. Therefore, the arc-shaped core blocks 176 in the circumferential direction with respect to the main body core block 177 are easily moved.

Thereafter, the bolts 52 are fastened again. In this manner, all the arc-shaped core blocks 176 are fixed to the outer peripheral portion of the main body core block 177, to thereby complete the first rotor member 15.

The second rotor member 16 is also assembled by fixing all the arc-shaped core blocks 196 to the outer peripheral portion of the main body core block 197 in a procedure similar to that for the first rotor member 15.

A procedure of assembling the first rotor member 15 and the second rotor member 16 to manufacture the rotor 4 is similar to that of the first embodiment.

After the first rotor member 15 and the second rotor member 16 are assembled, all the bolts 52 are slightly loosened again. Then, the circumferential components of the magnetic repulsive force and the magnetic attractive force which are generated between the first magnets 181 and the second magnets 201 are applied in a direction in which the second protruding-portion engagement portions 411 are fitted into the second recessed-portion engagement portions 432. In this manner, the arc-shaped core blocks 176 and the arc-shaped core blocks 196 are positioned more reliably with respect to the main body core block 177 and with respect to the main body core block 197, respectively, in the circumferential direction and the axial direction. After the bolts 52 are loosened so that the arc-shaped core blocks 176 and 196 are positioned, the bolts 52 are tightened again to fix the arc-shaped core blocks 176 and 196 to the main body core blocks 177 and 197, respectively.

In the rotor 4 described above, the first core member 17 is divided into the main body core block 177 and the arc-shaped core blocks 176, and the second core member 19 is divided into the main body core block 197 and the arc-shaped core blocks 196. Therefore, operations can be performed on the arc-shaped core blocks 176 and 196 which are smaller than the first core member 17 and the second core member 19. Thus, labor for an operation of manufacturing the first rotor member 15 and the second rotor member 16 can be reduced.

Further, the second protruding portions 41 are formed on the plurality of arc-shaped core blocks 176 and the plurality of arc-shaped core blocks 196, and the second recessed portions 43 are formed in the outer peripheral portion of the main body core block 177 and the outer peripheral portion of the main body core block 197. The second protruding portions 41 are engaged with the second recessed portions 43 in the same direction in which the first protruding portions 31 are brought into engagement with the first recessed portions 32 in the circumferential direction of the rotor 4. Therefore, the arc-shaped core blocks 176 and the arc-shaped core blocks 196 can easily be positioned with respect to the main body core block 177 and the main body core block 197, respectively. Thus, the operation of assembling the first core member 17 and the second core member 19 can be easily performed.

Further, the second bolt insertion holes 51 formed in the main body core blocks 177 and 197 are the elongated holes extending along the circumferential direction of the rotor 4. The arc-shaped core blocks 176 are fastened to the main body core block 177, and the arc-shaped core blocks 196 are fastened to the main body core block 197 by the bolts 52 inserted into the second bolt insertion holes 51. Therefore, when the bolts 52 are loosened so as to move the arc-shaped core blocks 176 with respect to the main body core block 177 and move the arc-shaped core blocks 196 with respect to the main body core block 197 in the circumferential direction, the movement of the arc-shaped core blocks 176 and 196 can be guided by the bolts 52. In this manner, the operation of assembling the first core member 17 and the second core member 19 can be easily performed.

In the example described above, the first core member 17 is the core assembly member which includes the main body core block 177 and the plurality of arc-shaped core blocks 176 as the plurality of divided core blocks, and the second core member 19 is the core assembly member which includes the main body core block 197 and the plurality of arc-shaped core blocks 196 as the plurality of divided core blocks. However, only any one of the first core member 17 and the second core member 19 may be formed as the core assembly member.

Further, in the example described above, the width of the second protruding portion 41 is constant at any position in the projecting direction of the second protruding portion 41, and the width of the second recessed portion 43 is constant at any position in the depth direction of the second recessed portion 43. However, the width of the second protruding-portion engagement portion 411 may be increased toward an end portion of the second protruding portion 41 in a projecting direction thereof, and the width of the second recessed-portion engagement portion 432 may be increased toward a bottom surface of the recessed portion 43 in a depth direction thereof. In this manner, the second protruding-portion engagement portion 411 and the second recessed-portion engagement portion 432 can be engaged with each other in the radial direction of the rotor 4. Thus, the arc-shaped core blocks 176 and the arc-shaped core blocks 196 can be positioned with respect to the main body core block 177 and the main body core block 197, respectively, not only in the circumferential direction and the axial direction of the rotor 4 but also the radial direction thereof.

Further, in the example described above, the first bolt insertion holes 21 are formed in the arc-shaped core blocks 176 of the first core member 17, and the threaded holes 22 are formed in the arc-shaped core blocks 196 of the second core member 19. However, the first bolt insertion holes 21 may be formed in the main body core block 177 of the first core member 17, and the threaded holes 22 may be formed in the main body core block 197 of the second core member 19. Even in this manner, the first core member 17 and the second core member 19 can be fastened to each other by the bolts 23 inserted into the first bolt insertion holes 21.

Further, in the example described above, the four arc-shaped core blocks 176 divided equally in the circumferential direction of the rotor 4 are mounted to the outer peripheral portion of the main body core block 177, and the four arc-shaped core blocks 196 divided equally in the circumferential direction of the rotor 4 are mounted to the outer peripheral portion of the main body core block 197. However, two, three, or five arc-shaped core blocks 176 and two, three, or five arc-shaped core blocks 196 may be formed by division in the circumferential direction of the rotor 4 as long as a center angle of an arc of each of the arc-shaped core blocks 176 and 196 is 180° or smaller. Further, a plurality of arc-shaped core blocks unequally divided in the circumferential direction of the rotor 4 may be mounted to each of the outer peripheral portion of the main body core block 177 and the outer peripheral portion of the main body core block 197.

Further, in the example described above, the second protruding portions 41 are members which are formed separately from the arc-shaped core blocks 176 and 196 and the main body core blocks 177 and 197. However, the second protruding portions 41 and the arc-shaped core blocks 176 may be formed of a single member in the first core member 17, and the second protruding portions 41 and the arc-shaped core blocks 196 may be formed of a single member in the second core member 19.

Further, in the example described above, the second protruding portions 41 are formed on the arc-shaped core blocks 176 and 196, and the second recessed portions 43 are formed in the main body core blocks 177 and 197. However, the second protruding portions 41 may be formed on the main body core blocks 177 and 197, and the second recessed portions 43 may be formed in the arc-shaped core blocks 176 and 196. In this case, the second protruding portions 41 and the main body core block 177 may be formed of a single member, and the second protruding portions 41 and the main body core block 197 may be formed of a single member. Further, the second protruding portions 41 may be members which are formed separately from the main body core blocks 177 and 197 and the arc-shaped core blocks 176 and 196. When the second protruding portions 41 are members which are formed separately from the main body core blocks 177 and 197 and the arc-shaped core blocks 176 and 196, fitting holes into which the second protruding portions 41 as the tapered blocks are to be fitted may be formed in the outer peripheral surface of the main body core block 177 and the outer peripheral surface of the main body core block 197, or the second protruding portions 41 may be fixed onto the outer peripheral surface of the main body core block 177 and the outer peripheral surface of the main body core block 197 by, for example, bolts or welding.

Further, in the example described above, the plurality of second bolt insertion holes 51 are all formed as the elongated holes. However, at least any one of the plurality of second bolt insertion holes 51 may be a circular hole. In this case, the position of the second bolt insertion hole 51 formed as the circular hole is set so as to be aligned with the positions of the bolt holes in the arc-shaped core blocks 176 and 196 when the arc-shaped core blocks 176 are positioned with respect to the main body core block 177 and the arc-shaped core blocks 196 are positioned with respect to the main body core block 197 through engagement between the second protruding portions 41 and the second recessed portions 43.

Further, in the example described above, the second protruding-portion engagement portions 411 are simply fitted into the second recessed-portion engagement portions 432. However, the second protruding-portion engagement portions 411 may be press-fitted into the second recessed-portion engagement portions 432. In this manner, a state in which the second protruding-portion engagement portions 411 are fitted into the second recessed-portion engagement portions 432 can be more reliably retained.

Further, in the example described above, each of the second protruding-portion engagement portions 411 has such a tapered shape that the width thereof continuously decreases in the circumferential direction, and each of the second recessed-portion engagement portions 432 has such a tapered shape that the width thereof continuously decreases in the circumferential direction. However, each of the second protruding-portion engagement portion 411 and the second recessed-portion engagement portion 432 may have a shape with a constant width in the circumferential direction in place of the tapered shape. Specifically, the width of the second protruding portion 41 may be set constant at any position in the circumferential direction, and the width of the second recessed portion 43 may be set constant at any position in the circumferential direction.

Fifth Embodiment

In the first core member and the second core member, each of the arc-shaped core blocks 176 and 196 may be formed by laminating a plurality of magnetic plates.

Figure 24:
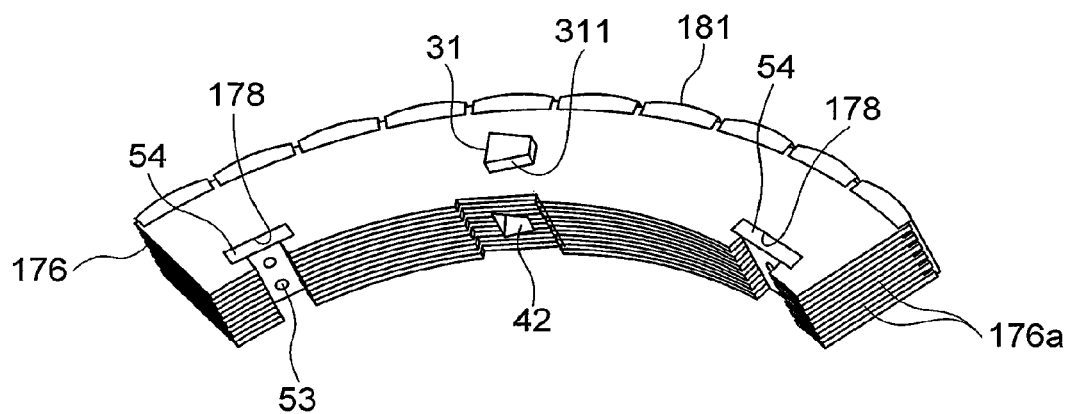
FIG. 24 is a perspective view for illustrating an arc-shaped core block of the first core member in the rotor according to a fifth embodiment of the present invention.

Specifically, FIG. 24 is a perspective view for illustrating the arc-shaped core block 176 of the first core member 17 in the rotor according to a fifth embodiment of the present invention. In the first core member 17, each of the arc-shaped core blocks 176 is formed by laminating a plurality of magnetic plates 176*a* in the axial direction. As the magnetic plate, for example, a steel plate is used. The magnetic plates 176*a* are laminated in connection to each other by, for example, caulking or welding.

A plurality of nut block grooves 178 extending along the axial direction of the rotor 4 are formed in the inner peripheral portion of the arc-shaped core block 176. A cross section of each of the nut block grooves 178 has an accommodating portion including a bottom surface of the groove and an opening portion extending from the accommodating portion to reach the inner peripheral surface of the arc-shaped core block 176. A width of the accommodating portion is larger than a width of the opening portion.

In the accommodating portion of the nut block groove 178, a nut block 54 having a plurality of threaded holes 53 is press-fitted. In FIG. 24, two threaded holes 53 are formed in the nut block 54 having a plate-like shape. In each of the threaded holes 53 of the nut block 54, the bolt 52 inserted into the second bolt insertion hole 51 of the main body core block 177 is mounted through the opening portion of the nut block groove 178.

Even in the second core member 19, each of the arc-shaped core blocks 196 is formed by laminating the plurality of magnetic plates in the axial direction. A structure of each of the arc-shaped core blocks 196 of the second core member 19 is similar to that of each of the arc-shaped core blocks 176 of the first core member 17. Other configurations are similar to those of the fourth embodiment.

As described above, each of the arc-shaped core blocks 176 and 196 is formed of the laminate of the plurality of magnetic plates. As a result, generation of an eddy current in the first core member 17 and the second core member 19 can be suppressed. Hence, efficiency of the rotary electric machine can be improved.

In the example described above, each of the arc-shaped core blocks 176 and 196 is formed of the laminate of the plurality of magnetic plates in each of the first core member 17 and the second core member 19. However, only any one of each of the arc-shaped core blocks 176 of the first core member 17 and each of the arc-shaped core blocks 196 of the second core member 19 may be formed of the laminate of the plurality of magnetic plates.

Further, in the example described above, the nut block grooves 178 are formed in each of the arc-shaped core blocks 176 and 196, and the nut block 54 having the threaded holes 53 is fitted into each of the nut block grooves 178. However, the nut block grooves 178 and the nut blocks 54 are not required to be provided in the arc-shaped core blocks 176 and 196 in a case where the threaded holes can be directly formed in the laminate of the plurality of magnetic plates.

Sixth Embodiment

In each of the embodiments described above, the present invention is applied to the inner rotor type rotary electric machine in which the rotor 4 is arranged on the radially inner side of the stator 2 having a tubular shape. However, the present invention may also be applied to an outer rotor type rotary electric machine in which the stator is arranged on a radially inner side of the rotor having a tubular shape.

Figure 25:
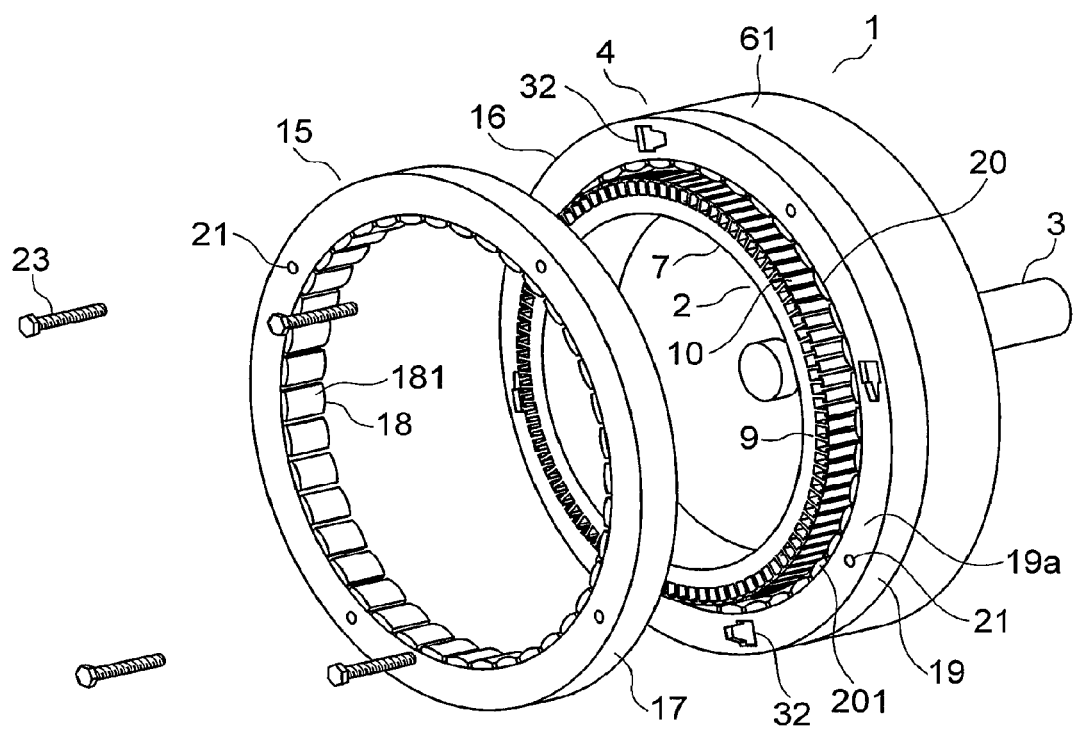
FIG. 25 is an exploded perspective view for illustrating the rotary electric machine of a sixth embodiment of the present invention.

FIG. 25 is an exploded perspective view for illustrating the rotary electric machine 1 according to a sixth embodiment of the present invention. In the rotary electric machine 1, the stator 2 is arranged on a radially inner side of the rotor 4 having a tubular shape. The rotor 4 is fixed to the rotary shaft 3. In this manner, the rotor 4 is rotated integrally with the rotary shaft 3 about the axis of the rotary shaft 3 as the center.

The stator 2 is arranged coaxially with the rotary shaft 3. Further, in the stator 2 including the stator core 7 and the stator coils 8, the plurality of magnetic-pole teeth 10 project radially outward from the core back 9 of the stator core 7. The conductive wires of the stator coils 8 pass through the slots formed between the magnetic-pole teeth 10. The rotating electric field is generated in the stator 2 by supply of the AC current to the stator coils 8.

The rotor 4 includes the first rotor member 15, the second rotor member 16, and a rotor base 61 having a disc-like shape. The first rotor member 15, the second rotor member 16, and the rotor base 61 are fixed to each other under a state of being aligned in the axial direction of the rotor 4. The rotor base 61 is fixed to the rotary shaft 3.

The first rotor member 15 includes the first core member 17 having a tubular shape and the first magnet group 18 provided to an inner peripheral portion of the first core member 17. The second rotor member 16 includes the second core member 19 having a tubular shape and the second magnet group 20 provided to an inner peripheral portion of the second core member 19. The first magnet group 18 and the second magnet group 20 are adjacent to each other in the axial direction of the rotor 4.

The first magnet group 18 includes the plurality of first magnets 181 arrayed in the circumferential direction of the rotor 4. The number of first magnets 181 and the relationship of the magnetic poles thereof are similar to those of the first embodiment. Each of the first magnets 181 is opposed to the stator 2 in the radial direction of the rotor 4.

The second magnet group 20 includes the plurality of second magnets 201 arrayed in the circumferential direction of the rotor 4. The number of second magnets 201 and the relationship of the magnetic poles thereof are similar to those of the first embodiment. A positional relationship between the first magnets 181 and the second magnets 201 in the circumferential direction of the rotor 4 is also similar to that of the first embodiment. Each of the second magnets 201 is opposed to the stator 2 in the radial direction of the rotor 4.

The first rotor member 15 and the second rotor member 16 are fixed to each other so that the side surface 17a of the first core member 17 and the side surface 19a of the second core member 19 are opposed to each other. The second rotor member 16 is fixed to the rotor base 61 so that a side surface of the second core member 19, which is on the side opposite to the side surface 19a, is opposed to the rotor base 61.

Figure 26:
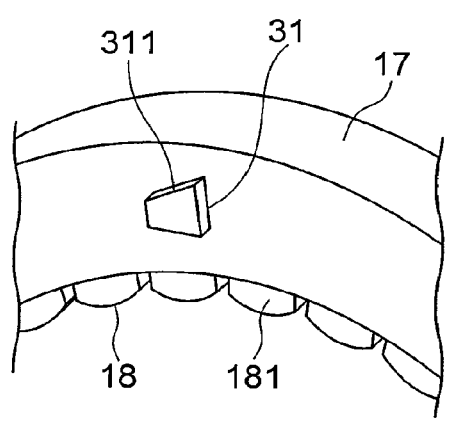
FIG. 26 is an enlarged perspective view for illustrating a side surface of the first core member illustrated in FIG. 25.

FIG. 26 is an enlarged perspective view for illustrating the side surface 17a of the first core member 17 illustrated in FIG. 25. The plurality of (four in this example) first protruding portions 31 are formed on the side surface 17a of the first core member 17 at intervals in the circumferential direction of the rotor 4. As illustrated in FIG. 25, the same number of first recessed portions 32 as the number of first protruding portions 31 are formed in the side surface 19a of the second core member 19 at intervals in the circumferential direction of the rotor 4. A structure of each of the first protruding portions 31, a structure of each of the first recessed portions 32, and a circumferential positional relationship between the first protruding portions 31 and the first recessed portions 32 are similar to those of the first embodiment.

The first rotor member 15 is positioned in the circumferential direction and the radial direction with respect to the second rotor member 16 through the engagement of the first protruding portions 31 with the first recessed portions 32 in the circumferential direction.

The plurality of through holes are formed in each of the first core member 17 and the second core member 19 as the first bolt insertion holes 21. A plurality of through holes (not shown) are formed in the rotor base 61 so as to match with the circumferential positions of the first bolt insertion holes 21. The bolts 23 sequentially inserted into the first bolt insertion holes 21 of the first core member 17 and the first bolt holes 21 of the second core member 19 are mounted into the threaded holes of the rotor base 61. The first core member 17 and the second core member 19 are fastened collectively to the rotor base 61 by the bolts 23 sequentially inserted into the first bolt insertion holes 21 of the first core member 17 and the first bolt insertion holes 21 of the second core member 19. Other configurations are similar to those of the first embodiment. Further, a procedure of assembling the first rotor member 15 and the second rotor member 16 to manufacture the rotor 4 is similar to that of the first embodiment.

As described above, even when the present invention is applied to the outer rotor type rotary electric machine 1 in which the stator 2 is arranged on the radially inner side of the rotor 4 having the tubular shape, the first protruding portions 31 can be engaged with the first recessed portions 32 in the circumferential direction. Thus, the first rotor member 15 can be more reliably and easily positioned in the circumferential direction and the radial direction with respect to the second rotor member 16. As a result, the productivity of the rotor 4 can be improved.

In the example described above, each of the first core member 17 and the second core member 19 is formed as an integral core member without being divided into the plurality of divided blocks in the example described above. However, at least any one of the first core member 17 and the second core member 19 may be formed as a core assembly member divided into a plurality of divided blocks as in the case of the fourth embodiment. In this case, the core assembly member includes a main body core block having a tubular shape and a plurality of arc-shaped core blocks mounted to an inner peripheral portion of the main body core block as the plurality of divided blocks. Further, the magnets included in the first magnets 181 and the second magnets 201, which are provided to the core assembly member, are mounted to each of the arc-shaped core blocks. Further, the second recessed portions similar to those of the fourth embodiment are formed in one of the main body core block and the arc-shaped core blocks, and the second protruding portions similar to those of the fourth embodiment, to be engaged with the second recessed portions in the circumferential direction, are formed on another thereof. Further, a plurality of second bolt insertion holes being elongated holes similar to those of the fourth embodiment are formed in the main body core block. The arc-shaped core blocks are fastened to the inner peripheral portion of the main body core block by bolts inserted into the second bolt insertion holes. The first bolt insertion holes 21 formed in the core assembly member may be formed in the main body core block or the arc-shaped core blocks.

Further, in the example described above, the first bolt insertion holes 21 are formed in each of the first core member 17 and the second core member 19, and the threaded holes into which the bolts 23 inserted into the first bolt insertion holes 21 are mounted are formed in the rotor base 61. However, the threaded holes may be formed in the second core member 19 so that the bolts 23 inserted into the first bolt insertion holes 21 of the first core member 17 are mounted into the threaded holes of the second core member 19. In this case, the second core member 19 is fixed to the rotor base 61 by, for example, another bolts or welding.

Further, in the example described above, each of the rotor members 15 and 16 is fixed to the rotor base 61 by the bolts. However, for example, the rotor members 15 and 16 which are fixed to each other by the bolts may be fixed to the rotor base 61 by welding, or the rotor members 15 and 16 which are fixed to each other by the bolts may be fixed to an inner surface of the rotor base 61 having a cylindrical shape by shrink fitting.

Seventh Embodiment

In each of the embodiments described above, the present invention is applied to the radial gap type rotary electric machine in which the stator 2 and the rotor 4 are opposed to each other in the radial direction. However, the present invention may also be applied to an axial gap type rotary electric machine in which the stator 2 and the rotor 4 are opposed to each other in the axial direction.

Figure 27:
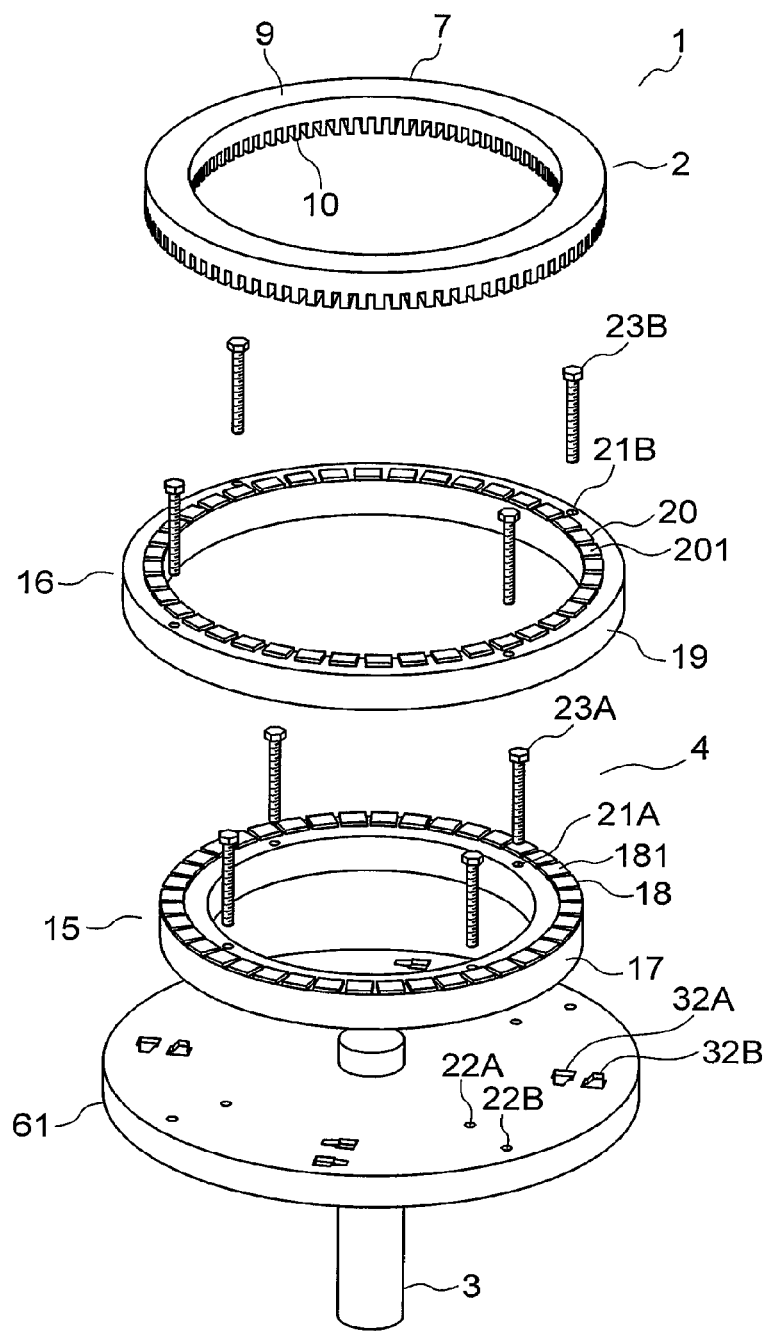
FIG. 27 is an exploded perspective view for illustrating the rotary electric machine in a seventh embodiment of the present invention.

FIG. 27 is an exploded perspective view for illustrating the rotary electric machine according to a seventh embodiment of the present invention. In the rotary electric machine 1, the rotor 4 is opposed to the stator 2 having an annular shape in the axial direction of the rotary shaft 3 through a gap therebetween. The rotor 4 is fixed to the rotary shaft 3. In this manner, the rotor 4 is rotated integrally with the rotary shaft 3 about the axis of the rotary shaft 3 as the center while being opposed to the stator 2 in the axial direction.

The stator 2 is arranged coaxially with the rotary shaft 3. Further, in the stator 2 including the stator core 7 and the stator coils (not shown), the plurality of magnetic-pole teeth 10 project toward the rotor 4 side along the axial direction from the core back 9 of the stator core 7. The conductive wires of the stator coils pass through the slots formed between the magnetic-pole teeth 10. The rotating electric field is generated in the stator 2 by supply of the AC current to the stator coils.

The rotor 4 includes the first rotor member 15 having an annular shape, the second rotor member 16 having an annular shape, and a rotor base 61 having a disc-like shape.

An outer diameter of the first rotor member 15 is smaller than an inner diameter of the second rotor member 16. The first rotor member 15 is arranged on a radially inner side with respect to the second rotor member 16. Each of the first rotor member 15 and the second rotor member 16 is fixed to the rotor base 61 in the axial direction of the rotor 4. The rotor base 61 is fixed to the rotary shaft 3.

The first rotor member 15 includes the first core member 17 having an annular shape and the first magnet group 18 provided to a side surface of the first core member 17, which is close to the stator 2 side. The second rotor member 16 includes the second core member 19 having an annular shape and the second magnet group 20 provided to a side surface of the second core member 19, which is close to the stator 2 side. The outer peripheral surface of the first core member 17 and an inner peripheral surface of the second core member 19 are held in contact with each other. The first magnet group 18 and the second magnet group 20 are adjacent to each other in the axial direction of the rotor 4.

The first magnet group 18 includes the plurality of first magnets 181 arrayed in the circumferential direction of the rotor 4. The number of first magnets 181 and the relationship of the magnetic poles thereof are similar to those of the first embodiment. Each of the first magnets 181 is opposed to the stator 2 in the radial direction of the rotor 4.

The second magnet group 20 includes the plurality of second magnets 201 arrayed in the circumferential direction of the rotor 4. The number of second magnets 201 and the relationship of the magnetic poles thereof are similar to those of the first embodiment. Each of the second magnets 201 is opposed to the stator 2 in the radial direction of the rotor 4.

The first magnet 181 and the second magnet 201 which are adjacent to each other in the radial direction of the rotor 4 are shifted from each other by the skew mechanical angle α° in the circumferential direction of the rotor 4. Specifically, the rotor 4 has a step skew structure in which the magnetic poles of the first rotor member 15 are shifted in the circumferential direction with respect to the magnetic poles of the second rotor member 16.

The first core member 17 is fixed to the rotor base 61 so that the side surface 17*a* on the side opposite to the stator 2 faces the rotor base 61. The second rotor member 16 is fixed to the rotor base 61 so that the side surface 19*a* on the side opposite to the stator 2 faces the rotor base 61.

Figure 28:
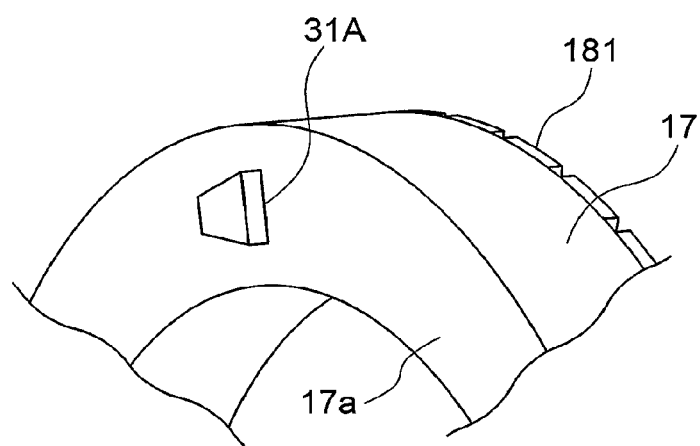
FIG. 28 is an enlarged perspective view for illustrating the side surface of the first core member illustrated in FIG. 27.

FIG. 28 is an enlarged perspective view for illustrating the side surface 17*a* of the first core member 17 illustrated in FIG. 27. The plurality of (four in this example) first protruding portions 31A are formed on the side surface 17*a* of the first core member 17 at intervals in the circumferential direction of the rotor 4. As illustrated in FIG. 27, the same number of recessed portions 32A as the number of first protruding portions 31A are formed in the rotor base 61 at intervals in the circumferential direction of the rotor 4. A structure of each of the first protruding portions 31A, a structure of each of the first recessed portions 32A, and a circumferential positional relationship between the first protruding portions 31A and the first recessed portions 32A are similar to the structure of each of the first protruding portions 31, the structure of each of the first recessed portions 32, and the circumferential positional relationship between the first protruding portions 31 and the first recessed portions 32 of the first embodiment.

Figure 29:
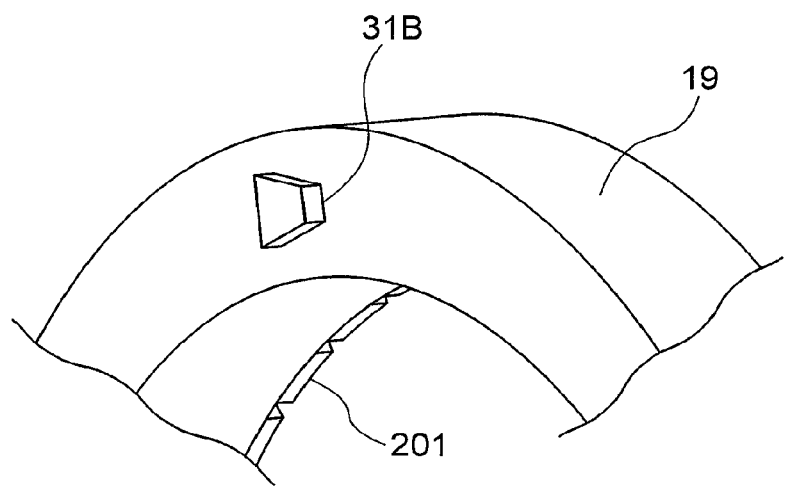
FIG. 29 is an enlarged perspective view for illustrating a side surface of the second core member illustrated in FIG. 27.

Further, FIG. 29 is an enlarged perspective view for illustrating the side surface 19*a* of the first core member 19 illustrated in FIG. 27. The plurality of (four in this example) first protruding portions 31B are formed on the side surface 19*a* of the second core member 19 at intervals in the circumferential direction of the rotor 4. As illustrated in FIG. 27, the same number of recessed portions 32B as the number of first protruding portions 31B are formed in the rotor base 61 at intervals in the circumferential direction of the rotor 4. A structure of each of the first protruding portions 31B, a structure of each of the first recessed portions 32B, and a circumferential positional relationship between the first protruding portions 31B and the first recessed portions 32B are similar to the structure of each of the first protruding portions 31, the structure of each of the first recessed portions 32, and the circumferential positional relationship between the first protruding portions 31 and the first recessed portions 32 of the first embodiment. In this example, a direction in which the first protruding portions 31A are brought into engagement with the first recessed portions 32A and a direction in which the first protruding portions 31B are brought into engagement with the first recessed portions 32B are opposite to each other in the circumferential direction of the rotor 4.

The first rotor member 15 is positioned in the circumferential direction and the radial direction with respect to the rotor base 61 through the engagement of the first protruding portions 31A with the first recessed portions 32A in the circumferential direction. Further, the second rotor member 16 is positioned in the circumferential direction and the radial direction with respect to the rotor base 61 through engagement of the first protruding portions 31B with the first recessed portions 32B in the circumferential direction.

A plurality of through holes are formed in the first core member 17 as first bolt insertion holes 21A, and a plurality of through holes are formed in the second core member 19 as first bolt insertion holes 21B. A plurality of threaded holes 22A opposed to the first bolt insertion holes 21A formed in the first core member 17 in the axial direction, and a plurality of threaded holes 22B opposed to the first bolt insertion holes 21B formed in the second core member 19 in the axial direction are formed in the rotor base 61. Bolts 23A inserted into the first bolt insertion holes 21A are mounted into the threaded holes 22A of the rotor base 61, and bolts 23B inserted into the first bolt insertion holes 21B are mounted into the threaded holes 22B of the rotor base 61. The first core member 17 is fastened to the rotor base 61 by the bolts 23A inserted into the first bolt insertion holes 21A. The second core member 19 is fastened to the rotor base 61 by the bolts 23B inserted into the first bolt insertion holes 21B. Other configurations are similar to those of the first embodiment.

When the first rotor member 15 and the second rotor member 16 are to be assembled to the rotor base 61 to manufacture the rotor 4, the first protruding portions 31A of the first rotor member 15 are first inserted into first recessed-portion insertion portions of the first recessed portions 32A of the rotor base 61. Then, the first rotor member 15 is rotated with respect to the rotor base 61 in a direction in which first protruding-portion engagement portions of the first protruding portions 31A are fitted into the first recessed-portion engagement portions of the first recessed portions 32A. In this manner, the first rotor member 15 is positioned in the circumferential direction and the radial direction with respect to the rotor base 61.

Thereafter, the bolts 23A are inserted into the first bolt insertion holes 21A so that the bolts 23A are mounted into the threaded holes 22A of the rotor base 61, to thereby fasten the first core member 17 to the rotor base 61. In this manner, the first rotor member 15 is fixed to the rotor base 61.

Thereafter, the second rotor member 16 is also fixed to the rotor base 61 in a similar manner to that for the first rotor member 15. Specifically, the first protruding portions 31B of the second rotor member 16 are inserted into first recessed-portion insertion portions of the first recessed portions 32B of the rotor base 61. Then, the second rotor member 16 is rotated with respect to the rotor base 61 in a direction in which first protruding-portion engagement portions of the first protruding portions 31B are fitted into the first recessed-portion engagement portions of the first recessed portions 32B. In this manner, the second rotor member 16 is positioned in the circumferential direction and the radial direction with respect to the rotor base 61.

At this time, the circumferential components of the magnetic repulsive force and the magnetic attractive force which are generated between the first magnets 181 and the second magnets 201 are applied in the direction in which the protruding-portion engagement portions of the first protruding portions 31B are fitted into the recessed-portion engagement portions of the first recessed portions 32B. Thus, the second rotor member 16 is more reliably positioned in the circumferential direction and the radial direction with respect to the rotor base 61.

Thereafter, the bolts 23B are inserted into the first bolt insertion holes 21B so that the bolts 23B are mounted into the threaded holes 22B of the rotor base 61, to thereby fasten the second core member 19 to the rotor base 61. In this manner, the second rotor member 16 is fixed to the rotor base 61. Accordingly, the first rotor member 15 and the second rotor member 16 are fixed to the rotor base 61.

In this example, the second rotor member 16 is fixed to the rotor base 61 after the first rotor member 15 is fixed to the rotor base 61. However, the first rotor member 15 may be fixed to the rotor base 61 after the second rotor member 16 is fixed to the rotor base 61.

As described above, even when the present invention is applied to the axial gap type rotary electric machine 1 in which the rotor 4 and the stator 2 are opposed to each other in the axial direction, the first protruding portions 31A and the first protruding portions 31B can be engaged with the first recessed portions 32A and the first recessed portions 32B, respectively, in the circumferential direction. Thus, the first rotor member 15 and the second rotor member 16 can be more reliably and easily positioned in the circumferential direction and the radial direction with respect to the rotor base 61. In this manner, the productivity of the rotor 4 can be improved.

In the example described above, each of the first core member 17 and the second core member 19 is formed as an integral core member without being divided into the plurality of divided blocks. However, at least any one of the first core member 17 and the second core member 19 may be formed as a core assembly member including a plurality of divided core blocks arrayed in the circumferential direction of the rotor 4 as in the fourth embodiment. In this case, magnets included in the first magnets 181 and the second magnets 201, which are provided to the assembly core member, are mounted to the divided core blocks. In this manner, operations can be performed on each of the divided core blocks which are smaller in size than the first core member 17 and the second core member 19. Thus, labor for an operation of manufacturing the rotor 4 can be reduced.

Further, in the example described above, the first protruding portions 31A and the first core member 17 are formed of a single member. However, each of the first protruding portions 31A may be a member which is formed separately from the first core member 17, the second core member 19, and the rotor base 61. In this case, the first protruding portions 31A are fixed onto the side surface 17a of the first core member 17 by, for example, a bolt or welding.

Further, in the example described above, the first protruding portions 31B and the second core member 19 are formed of a single member. However, each of the first protruding portions 31B may be a member which is formed separately from the first core member 17, the second core member 19, and the rotor base 61. In this case, the first protruding portions 31B are fixed onto the side surface 19a of the second core member 19 by, for example, a bolt or welding.

Further, in the example described above, the first protruding portions 31A are formed on the first core member 17, and the first recessed portions 32A are formed in the rotor base 61. However, the first recessed portions 32A may be formed in the first core member 17, and the first protruding portions 31A may be formed on the rotor base 61. In this case, the first protruding portions 31A may be a single member which is formed together with the first core member 17, or may be members which are formed separately from the first core member 17, the second core member 19, and the rotor base 61.

Further, in the example described above, the first protruding portions 31B are formed on the second core member 19, and the first recessed portions 32B are formed in the rotor base 61. However, the first recessed portions 32B may be formed in the second core member 19, and the first protruding portions 31B may be formed on the rotor base 61. In this case, the first protruding portions 31B may be a single member which is formed together with the second core member 19, or may be members which are formed separately from the first core member 17, the second core member 19, and the rotor base 61.

Further, in the example described above, all the first bolt insertion holes 21A of the first core member 17 are formed as circular holes. However, at least any one of the first bolt insertion holes 21A may be formed as an elongated hole extending along the circumferential direction of the rotor 4 as in the case of the third embodiment. In this manner, the bolt 23A inserted into the first bolt insertion hole 21A being the elongated hole can be used as a jack bolt. Thus, the same effects as those obtained in the third embodiment can be obtained.

Further, in the example described above, all the first bolt insertion holes 21B of the second core member 19 are formed as circular holes. However, at least any one of the first bolt insertion holes 21B may be formed as an elongated hole extending along the circumferential direction of the rotor 4 as in the case of the third embodiment. In this manner, the bolt 23B inserted into the first bolt insertion hole 21B being the elongated hole can be used as a jack bolt. Thus, the same effects as those obtained in the third embodiment can be obtained.

Further, in the example described above, the two rotor members being the first rotor member 15 and the second rotor member 16 are fixed to the rotor base 61 under a state of being aligned in the radial direction. However, three or more rotor members being the first rotor member 15, the second rotor member 16, and one or more additional rotor members each having an annular shape, may be fixed to the rotor base 61 under a state of being aligned in the radial direction. In this case, a structure of the additional rotor member is similar to that of the first rotor member 15, and an inner diameter of the additional rotor member is set larger than an outer diameter of the rotor member provided on an inner side thereof. Further, first protruding portions similar to the first protruding portions 31 of the first embodiment are formed on one of the additional rotor member and the rotor base 61, and first recessed portions similar to the first recessed portions 32 of the first embodiment are formed in another thereof.

Further, in the first to sixth embodiments, the first protruding portions 31 and the first core member 17 are formed of a single member. However, each of the first protruding portions 31 may be a member which is formed separately from the first core member 17 and the second core member 19. In this case, the first protruding portions 31 are fixed to the side surface 17a of the first core member 17 by, for example, a bolt or welding.

Further, in the first to sixth embodiments, the first protruding portions 31 are formed on the first core member 17, and the first recessed portions 32 are formed in the second core member 19. However, the first recessed portions 32 may be formed in the first core member 17, and the first protruding portions 31 may be formed on the second core member 19. In this case, the first protruding portions 31 may be a single member which is formed together with the second core member 19, or may be members which are formed separately from the first core member 17 and the second core member 19.

Further, in the third to seventh embodiments, the structures of the first protruding portions 31, 31A, and 31B and the first recessed portions 32, 32A, and 32B are similar to those of the first embodiment. However, a structure similar to that of the second embodiment, in which the width of the first protruding-portion engagement portion increases toward the end portion of the first protruding portion 31 in the projecting direction thereof may be used for each of the first protruding portions 31, 31A, and 31B, and a structure similar to that of the second embodiment, in which the width of the first recessed-portion engagement portion increases toward the bottom surface of the first recessed portion 32 in the depth direction thereof may be used for each of the first recessed portions 32, 32A, and 32B.

Further, in the fourth to sixth embodiments, all the first bolt insertion holes 21 are formed as circular holes. However, at least any one of the first bolt insertion holes 21 may be formed as an elongated hole extending along the circumferential direction of the rotor 4 as in the third embodiment. In this manner, the bolt 23 inserted into the first bolt insertion hole 21 being the elongated hole can be used as a jack bolt, which causes the first core member 17 to be displaced toward the second core member 19. Thus, the same effects as those obtained in the third embodiment can be obtained.

Further, in each of the embodiments described above, the first protruding-portion engagement portions of the first protruding portions 31, 31A, and 31B are simply fitted into the first recessed-portion engagement portions 32, 32A, and 32B, respectively. However, the first protruding-portion engagement portions of the first protruding portions 31, 31A, and 31B may be press-fitted into the first recessed-portion engagement portions 32, 32A, and 32B, respectively. In this manner, the state in which the first protruding-portion engagement portions are fitted into the first recessed-portion engagement portions can be more reliably retained.

Further, in each of the embodiments described above, each of the first protruding-portion engagement portions of the first protruding portions 31, 31A, and 31B has such a tapered shape that the width thereof continuously decreases in the circumferential direction, and each of the first recessed-portion engagement portions of the first recessed portions 32, 32A, and 32B has such a tapered shape that the width thereof continuously decreases in the circumferential direction. However, each of the first protruding-portion engagement portion and the first recessed-portion engagement portion may have a shape with a constant width in the circumferential direction in place of the tapered shape. Specifically, the width of the first protruding portion of the first recessed portions 31, 31A, and 31B may be set constant at any position in the circumferential direction, and the width of the second recessed portion of the first recessed portions 32, 32A, and 32B may be set constant at any position in the circumferential direction.

Further, the rotary electric machine of each of the embodiments described above is applicable to any of, for example, an electric motor, a power generator, and a generator-motor.

The invention claimed is:

1. A rotor for a rotary electric machine, comprising:
a first rotor member; and
a second rotor member,
the first rotor member including a first core member and a first magnet group provided to the first core member,
the second rotor member including a second core member and a second magnet group provided to the second core member,
the first core member and the second core member being fixed to each other under a state of being aligned in an axial direction of the rotor,
the first magnet group and the second magnet group being adjacent to each other in the axial direction,
the first magnet group including a plurality of first magnets arrayed in a circumferential direction of the rotor,
the second magnet group including a plurality of second magnets arrayed in the circumferential direction,
the first magnet and the second magnet, which are adjacent to each other and have the same polarity, being shifted from each other in the circumferential direction so as to mutually receive a magnetic repulsive force in the circumferential direction,
one of the first core member and the second core member having a first recessed portion, and another of the first core member and the second core member having a first protruding portion to be engaged with the first recessed portion in the circumferential direction,
at least any one of the first core member and the second core member is formed as a core assembly member including a main body core block and a plurality of arc-shaped core blocks mounted to any one of an outer peripheral portion and an inner peripheral portion of the main body core block,
magnets included in the plurality of first magnets and the plurality of second magnets, which are provided to the core assembly member, are provided to the arc-shaped core blocks,
any one of the main body core block and the plurality of arc-shaped core blocks has a second recessed portion formed thereon, and another of the main body core block and the plurality of arc-shaped core blocks has a second protruding portion formed thereon to be engaged with the second recessed portion in a direction in which the first protruding portion is brought into engagement with the first recessed portion, the second recessed portion has a second recessed-portion engagement portion having a width which continuously decreases in a direction in which the second protruding portion is brought into engagement with the second recessed portion, and the second protruding portion has a second protruding-portion engagement portion to be fitted into the second recessed-portion engagement portion.

2. A rotor for a rotary electric machine according to claim 1, wherein the first protruding portion comprises a member which is formed separately from each of the first core member and the second core member.

3. A rotor for a rotary electric machine according to claim 1, wherein any one of the first core member and the second core member has a plurality of through holes as first bolt insertion holes, wherein at least any one of the first bolt insertion holes is an elongated hole extending along the circumferential direction of the rotor, and wherein the first core member and the second core member are fastened to each other by bolts inserted into the first bolt insertion holes.

4. A rotor for a rotary electric machine according to claim 1, wherein the second recessed-portion engagement portion has a width which continuously increases toward a bottom surface of the second recessed portion in a depth direction thereof, and wherein the second protruding-portion engagement portion has a width which continuously increases toward an end portion of the second protruding portion in a projecting direction thereof.

5. A rotor for a rotary electric machine according to claim 1, wherein each of the plurality of arc-shaped core blocks is formed by laminating a plurality of magnetic plates.

6. A rotor for a rotary electric machine according to claim 1, wherein the main body core block has a plurality of through holes as second bolt insertion holes, wherein at least any one of the second bolt insertion holes is an elongated hole extending along the circumferential direction of the rotor, and wherein the plurality of arc-shaped core blocks are fastened to the main body core block by bolts inserted into the second bolt insertion holes.

7. A rotor for a rotary electric machine, comprising:
a first rotor member;
a second rotor member; and
a rotor base,
the first rotor member including a first core member and a first magnet group provided to the first core member,
the second rotor member including a second core member a second magnet group provided to the second core member,
the first core member and the second core member being opposed to each other in a radial direction of the rotor and being fixed to the rotor base in an axial direction of the rotor,
the first magnet group and the second magnet group being adjacent to each other in the radial direction,
the first magnet group including a plurality of first magnets arrayed in a circumferential direction of the rotor,
the second magnet group including a plurality of second magnets arrayed in the circumferential direction,
the first magnet and the second magnet, which are adjacent to each other and have the same polarity, being shifted from each other by a certain angle in the circumferential direction,
one of at least any one of the first core member and the second core member and the rotor base having a first recessed portion, and another of the at least any one of the first core member and the second core member and the rotor base having a first protruding portion to be engaged with the first recessed portion in the circumferential direction.

8. A rotor for a rotary electric machine according to claim 7, wherein at least any one of the first core member and the second core member has a plurality of through holes as first bolt insertion holes, wherein at least any one of the first bolt insertion holes is an elongated hole extending along the circumferential direction, and wherein any one of the first core member and the second core member is fastened to the rotor base by bolts inserted into the first bolt insertion holes.

9. A rotor for a rotary electric machine according to claim 7, wherein the first protruding portion is a member which is formed separately from the first core member, the second core member, and the rotor base.

10. A rotor for a rotary electric machine according to claim 7, wherein at least any one of the first core member and the second core member is formed as a core assembly member including a plurality of divided core blocks arrayed in the circumferential direction of the rotor, and wherein any one of the first recessed portion and the first protruding portion is formed on each of the plurality of divided core blocks.

11. A rotor for a rotary electric machine according to claim 7, wherein the first recessed portion has a first recessed-portion engagement portion having a width which continuously decreases in a direction in which the first protruding portion is brought into engagement with the first recessed portion, and wherein the first protruding portion has a first protruding-portion engagement portion to be fitted into the first recessed-portion engagement portion.

12. A rotor for a rotary electric machine, comprising:
a first rotor member; and
a second rotor member,
the first rotor ember including a first core member and a first magnet group provided to the first core member,
the second rotor member including a second core member a second magnet group provided to the second core member,
the first core member and the second core member being fixed to each other under a state of being aligned in an axial direction of the rotor,
the first magnet group and the second magnet group being adjacent to each other in the axial direction,
the first magnet group including a plurality of first magnets arrayed in a circumferential direction of the rotor,
the second magnet group including a plurality of second magnets arrayed in the circumferential direction, the first magnet and the second magnet, which are adjacent to each other and have the same polarity, being shifted from each other in the circumferential direction so as to mutually receive a magnetic repulsive force in the circumferential direction, and one of the first core member and the second core member having a first recessed portion, and another of the first core member and the second core member having a first protruding portion to be engaged with the first recessed portion in the circumferential direction, wherein the first recessed portion has a first recessed-portion engagement portion having a width which continuously decreases in a direction in which the first protruding portion is brought into engagement with the first recessed portion, and wherein the first protruding portion has a first protruding-portion engagement portion to be fitted into the first recessed-portion engagement portion.

13. A rotor for a rotary electric machine according to claim 12,
wherein the first recessed-portion engagement portion has a width which continuously increases toward a bottom surface of the first recessed portion in a depth direction thereof, and
wherein the first protruding-portion engagement portion has a width which continuously increases toward an end portion of the first protruding portion in a projecting direction thereof.

14. A rotor for a rotary electric machine according to claim 12, wherein the first protruding portion comprises a member which is formed separately from each of the first core member and the second core member.

15. A rotor for a rotary electric machine according to claim 12,
wherein any one of the first core member and the second core member has a plurality of through holes as first bolt insertion holes,
wherein at least any one of the first bolt insertion holes is an elongated hole extending along the circumferential direction of the rotor, and
wherein the first core member and the second core member are fastened to each other by bolts inserted into the first bolt insertion holes.

16. A rotor for a rotary electric machine according to claim 12,
wherein at least any one of the first core member and the second core member is formed as a core assembly member including a main body core block and a plurality of arc-shaped core blocks mounted to any one of an outer peripheral portion and an inner peripheral portion of the main body core block,
wherein magnets included in the plurality of first magnets and the plurality of second magnets, Which are provided to the core assembly member, are provided to the arc-shaped core blocks, and
wherein any one of the main body core block and the plurality of arc-shaped core blocks has a second recessed portion formed thereon, and another of the main body core block and the plurality of arc-shaped core blocks has a second protruding portion formed thereon to be engaged with the second recessed portion in a direction in which the first protruding portion is brought into engagement with the first recessed portion.

17. A rotor for a rotary electric machine according to claim 16,
wherein the second recessed portion has a second recessed-portion engagement portion having a width which continuously decreases in a direction in which the second protruding portion is brought into engagement with the second recessed portion, and
wherein the second protruding portion has a second protruding-portion engagement portion to be fitted into the second recessed-portion engagement portion.

18. A rotor for a rotary electric machine according to claim 17,
wherein the second recessed-portion engagement portion has a width which continuously increases toward a bottom surface of the second recessed portion in a depth direction thereof, and
wherein the second protruding-portion engagement portion has a width which continuously increases toward an end portion of the second protruding portion in a projecting direction thereof.

19. A rotor for a rotary electric machine according to claim 16, wherein each of the plurality of arc-shaped core blocks is formed by laminating a plurality of magnetic plates.

20. A rotor for a rotary electric machine according to claim 16,
wherein the main body core block has a plurality of through holes as second bolt insertion holes,
wherein at least any one of the second bolt insertion holes is an elongated hole extending along the circumferential direction of the rotor, and
wherein the plurality of arc-shaped core blocks are fastened to the main body core block by bolts inserted into the second bolt insertion holes.

* * * * *